United States Patent [19]
Hoshi et al.

[11] Patent Number: 5,786,117
[45] Date of Patent: Jul. 28, 1998

[54] MEDIUM AND RELATED METHOD AND APPARATUS FOR RECORDING AND REPRODUCING INFORMATION IN CELLS USING MULTIPLE INTERFERENCE

[75] Inventors: Hiroaki Hoshi; Hideki Morishima; Masakuni Yamamoto; Eiji Yamaguchi; Susumu Matsumura, all of Kanagawa-ken, Japan

[73] Assignee: Canon Kabushiki Kaisha, Tokyo, Japan

[21] Appl. No.: 303,150

[22] Filed: Sep. 8, 1994

Related U.S. Application Data

[62] Division of Ser. No. 130,676, Oct. 4, 1993, abandoned, which is a continuation of Ser. No. 703,861, May 21, 1991, abandoned.

[30] Foreign Application Priority Data

| May 22, 1990 | [JP] | Japan | 2-130143 |
| May 22, 1990 | [JP] | Japan | 2-130144 |
| May 29, 1990 | [JP] | Japan | 2-137267 |
| Jul. 23, 1990 | [JP] | Japan | 2-192871 |
| Jul. 23, 1990 | [JP] | Japan | 2-192872 |
| Jul. 24, 1990 | [JP] | Japan | 2-194029 |

[51] Int. Cl.$^6$ .................................................. G11B 7/00
[52] U.S. Cl. ..................... 430/21; 430/945; 430/270.13
[58] Field of Search ................................ 430/21, 495, 945, 430/495.1, 270.13, 269; 346/76 L, 135.1; 365/127, 113, 119

[56] References Cited

U.S. PATENT DOCUMENTS

| 2,403,685 | 7/1946 | Sachtleben et al. | 359/586 |
| 4,183,094 | 1/1980 | Keezer et al. | 365/127 |
| 4,330,883 | 5/1982 | Ohta et al. | 369/275.2 |
| 4,637,953 | 1/1987 | Samamura et al. | 360/131 |
| 4,639,016 | 1/1987 | Tomita | 428/900 |

(List continued on next page.)

FOREIGN PATENT DOCUMENTS

| 0271630 | 6/1988 | European Pat. Off. |
| 287241 | 10/1988 | European Pat. Off. |
| 287382 | 10/1988 | European Pat. Off. |
| 290009 | 11/1988 | European Pat. Off. |
| 0294932 | 12/1988 | European Pat. Off. |
| 3741910 | 6/1988 | Germany . |
| 58-217901 | 11/1983 | Japan .......................... 359/584 |
| 64-35502 | 2/1988 | Japan .......................... 359/584 |
| 63-58639 | 3/1988 | Japan . |
| 2-96940 | 4/1990 | Japan . |
| 0329117 | 2/1991 | Japan . |
| 2017379 | 10/1979 | United Kingdom . |

OTHER PUBLICATIONS

Jenkins et al. "Fundamentals of Optics" ©1976 pp. 286–291.
"Jenkins & White Fundamentals of Optics", 1976 (pp. 288 to 294).

*Primary Examiner*—Martin Angebranndt
*Attorney, Agent, or Firm*—Fitzpatrick, Cella, Harper & Scinto

[57] ABSTRACT

An optical information recording medium includes a base, a reflecting layer formed on the base, a second layer formed parallel to the first reflecting layer at a predetermined distance from the same, and a recording layer formed between the first and second reflecting layers. The recording layer has an array of a plurality of cells having different refractive indices which are changed when irradiated with a light beam. The intensity of the light beam is modulated according to information. Irradiating the recording layer with the modulated light beam causes changes in the refractive index according to the intensity of the light beam. In another aspect, the wavelength of the light beam is changed within a predetermined range including at least one wavelength at which multiple interference occurs between the first and second reflecting layers with respect to each cell. The wavelength of light which has effective reflecting multiple interference is detected. The information recorded in the cell is reproduced in accordance with the wavelength detected. The medium may be used in an apparatus for recording and reproducing information.

10 Claims, 14 Drawing Sheets

U.S. PATENT DOCUMENTS

| | | | |
|---|---|---|---|
| 4,649,451 | 3/1987 | Tomita | 428/900 |
| 4,806,952 | 2/1989 | Nishida et al. | 346/135.1 |
| 4,845,529 | 7/1989 | Pearson et al. | 355/22 |
| 4,868,807 | 9/1989 | Okada et al. | 346/135.1 |
| 4,871,601 | 10/1989 | Miura et al. | 430/949 |
| 4,900,598 | 2/1990 | Suzuki | 369/288 |
| 4,908,813 | 3/1990 | Ojima et al. | 369/94 |
| 4,939,011 | 7/1990 | Takahashi et al. | 346/135.1 |
| 4,939,012 | 7/1990 | Dust et al. | 346/135.1 |
| 4,954,379 | 9/1990 | Nishida et al. | 369/288 |
| 4,969,141 | 11/1990 | Takaoka et al. | 369/288 |
| 4,989,231 | 1/1991 | Yasucka et al. | 369/286 |
| 4,995,705 | 2/1991 | Yoshinoga et al. | 365/145 |
| 4,998,239 | 3/1991 | Standjord et al. | 430/270 |
| 5,107,483 | 4/1992 | Nakajima et al. | 365/119 |
| 5,136,573 | 8/1992 | Kobayashi | 369/119 |

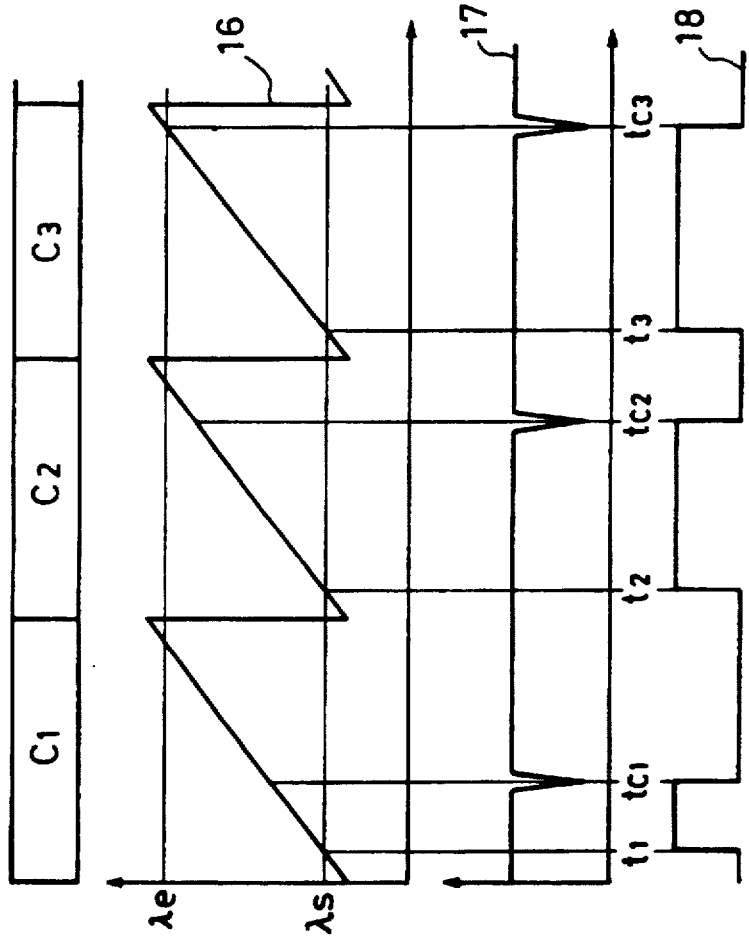

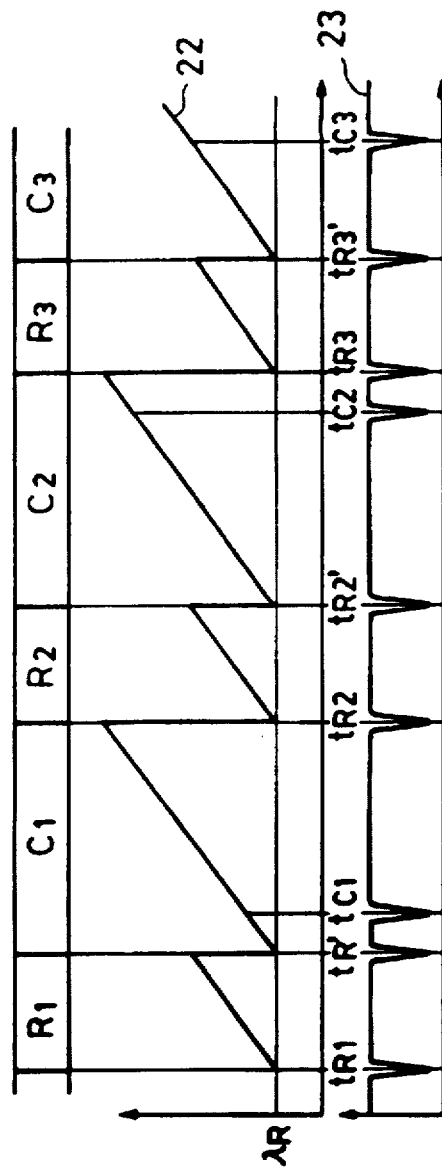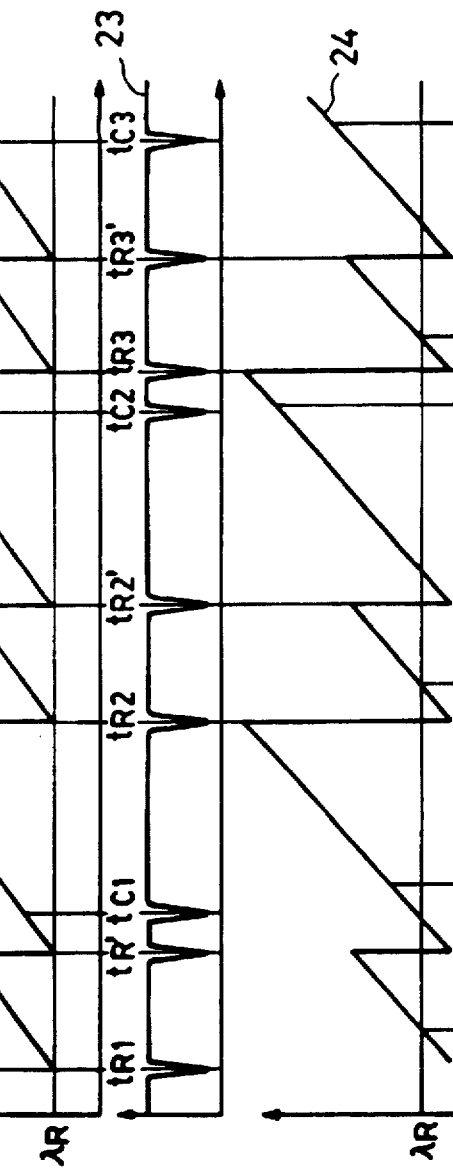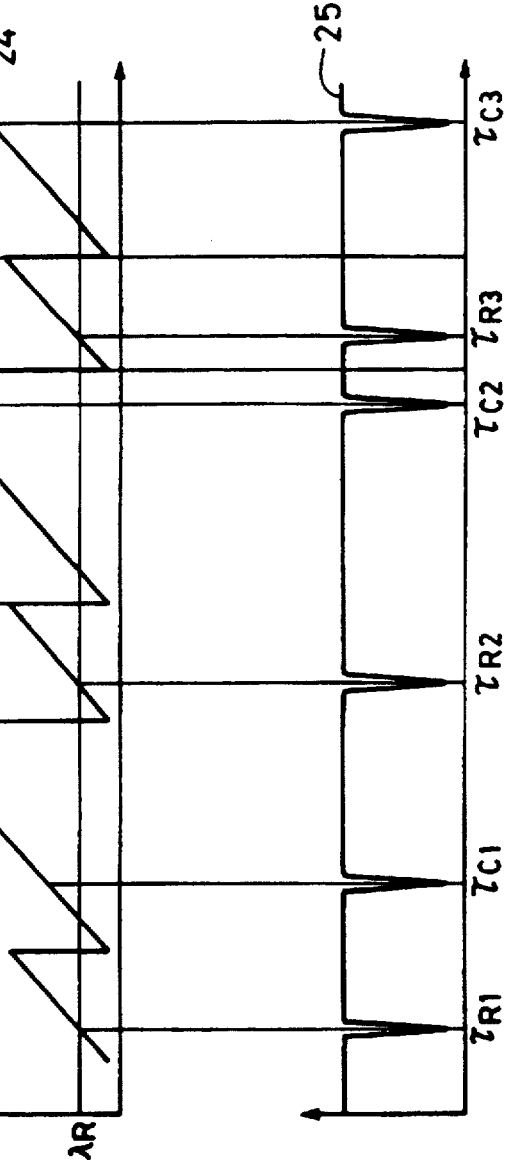

MEDIUM AND RELATED METHOD AND APPARATUS FOR RECORDING AND REPRODUCING INFORMATION IN CELLS USING MULTIPLE INTERFERENCE

This application is a division of application Ser. No. 08/130,376 filed Oct. 4, 1993, which is a continuation of application Ser. No. 07/703,861 filed May 21, 1991, both abandoned.

BACKGROUND OF THE INVENTION

1. Field of the Invention

This invention relates to a medium on which information can be optically recorded and from which recorded information can be optically read out and to a method of recording/reproducing information by using this medium and a related apparatus.

2. Description of the Prior Art

Recently, optical information recording mediums such as optical memories including optical disks, optical cards, optical tape, and the like, and recording/reproduction apparatuses using such mediums have notably been developed. Optical recording/reproduction mediums are low-priced in terms of cost per bit compared with magnetic disks or the like and have a high transfer rate, because optical memories are characterized by their capacity for high-density recording. Optical memories are being actively studied and developed in order to further increase their recording density.

The recording density of optical memories can be increased by reducing the minimum bit size, multivaluing information recording, or effecting multiple recording or information, and various methods relating to them have been proposed. Almost all well known multivaluing techniques utilize a continuous change in the reflectivity or a dyestuff medium or a phase change type medium. These techniques are based on fractioning an intermediate value between two reflectivity levels ensuring high contrast, and the signal-to-noise ratio (SNR) is therefore sacrificed for multivaluing in accordance with their principle, resulting in an increase in error rate.

A method utilizing the reflectivity change is as described below. If the complex indexes of reflection of the base and the medium are $N_1$ and $N_2$, the reflectivity R is, most simple, expressed by the following equation:

$$R = \left\{ \frac{N_1 - N_2}{N_1 + N_2} \right\} = \frac{(n_1 - n_2)^2 + (K_1 - K_2)^2}{(n_1 + n_2)^2 + (K_1 + K_2)^2}$$

where $n_m$ (m=1, 2) is a refractive index, $K_m$ (m=1, 2) is an attenuation coefficient, and $N_m = n_m - iK_m$. For example, in the case of a $TeO_x$ phase change medium, $N_2 = 3.5 - 0.8i$ in the amorphous state, and $N_2 = 3.9 - 1.3i$ in the crystallized state and, if $N_1 = 1.6$, a change $\Delta R$ in the reflectivity is small, 0.6%. It is difficult to uniformly fractionate $\Delta R$, because the change in $\Delta R$ with respect to the optical energy necessary for recording is non-linear, and it is also difficult to control this optical energy.

A method for increasing SNR, such as the one disclosed in U.S. Pat. No. 4,183,094, which is not specifically intended for multivaluing, has been proposed. In this method, a high-reflectivity metallic mirror is provided on the reverse side of a recording medium to increase the difference between the reflectivities in the two states by a thin-film multiple interference effect and to thereby improve the contrast. Specifically, in U.S. Pat. No. 4,183,094, a method of increasing the change in reflectivity by a change in the absorption coefficient is proposed. This method, however, also entails the above-mentioned problems of multivaluing, i.e., the problems of non-linearity and difficulty in controlling optical energy. If this method is applied to multivaluing, it is quite possible that the non-linearity of the change in reflectivity will be increased because the change in absorption spectrum and the multiple interference effect are combined. That is, even if the contrast and, hence, SNR of binary data can be improved by increasing the difference between the two reflectivities corresponding to binary states, it is not always possible to obtain characteristics suitable for multivaluing.

In digital memories, if the number of levels of multivaluing on the medium is L, the number M of information recording bits when binary digit data is recorded is expressed by the following equation:

$M = \log_2 L$

For example, even if 0-level multivaluing (L=8) on the medium is realized in the above-mentioned reflectivity change multivaluing, the recording density is only trebled since the amount of information which can be recorded by these levels is 3 bits (M=3). Considering signal processing of an apparatus such as a computer which receives data from a digital memory or an internal processing system of the memory such as a modulation/demodulation system, it can be said that the effect of multivaluing is satisfactory provided that multivalued data of 8 bits or more can be recorded. It is therefore necessary to effect 256 level multivaluing on the medium.

If multivaluing is effected by utilizing the reflectivity with respect to the intensity of light as described above and by dividing the change in reflectivity into 256 equal levels assuming ideally the change is linear from 0 to 100%, the change rate per level is 0.391%, and it is understood that this multivaluing is very difficult in terms of practice considering the technology for manufacturing the medium, stabilizing the intensity of light from the light source and detecting the changes.

A multiple recording method using the same absorption spectrum as U.S. Pat. No. 4,183,094 and utilizing a photochemical ball burning (PHB) effect has also been proposed. This multiple recording method enables multiple recording in theory. The development of PHB methods, however, is presently at a stage such that experiments for confirming the principle at a very low temperature have been finished. It is technically difficult to use a medium having a multiplicity or narrow-band absorption spectra at room temperature with stability. Furthermore, for a sequence of fundamental operations of a memory including recording or information, reproduction and erasing, it is necessary for the light source to have a spectrum width sufficiently narrower than each narrow absorption spectrum width. Many problems other than those due to instability of the mediums are also encountered. For example, wavelength absolute value control is required.

As described above, the conventional multivaluing techniques entail many problems, in particular, that of reduction in SNR, and that of limitation of the degree of multivaluing. Although methods for increasing the degree of multivaluing have been proposed, many technical problems are left.

SUMMARY OF THE INVENTION

In view of the above-described problems of the related art, an object of the present invention to provide an optical information recording medium capable of recording information at a high density and reading out recorded information at a high SNR and a recording/reproducing method of using this medium.

The invention in one aspect pertains to an optical information recording medium comprising a base, a first reflecting layer formed on the base, a second layer formed parallel to the first reflecting layer at a predetermined distance from same, and a recording layer formed between the first and second reflecting layers, the recording layer being changed in its refractive index when irradiated with a light beam.

The present invention in another aspect pertains to an optical information recording medium comprising a first base, a first reflecting layer formed on said first base, a second reflecting layer formed parallel to said first reflecting layer at a predetermined distance from same, a first recording layer formed between the first and second reflecting layers, the first recording layer being changed in its refractive index when irradiated with a light beam, a second base, a third reflecting layer formed on the second base, a fourth reflecting layer formed parallel to the third reflecting layer at a predetermined distance from same, a second recording layer formed between the third and fourth reflecting layers, the second recording layer being changed in its refractive index when irradiated with a light beam, and an adhesive layer for combining the bases and the reflecting layers and the recording layers so that the faces of the bases on which the reflecting layers and the recording layers are formed downwardly face each other.

The invention in another aspect pertains to a method using this medium comprising the steps of modulating the intensity or the light beam according to the information, and irradiating the recording layer with the modulated light beam to cause changes in refractive index according to the intensity of the light beam irradiated to the recording layer.

An optical information recording medium of the present invention on which information is previously recorded comprises a base, first and second reflecting layers formed on the base parallel to and at a predetermined distance from each other; and an information storage layer which is formed between the first and second reflecting layers and which has an array of a plurality of cells having different refractive indices according to the recorded information.

A method of reproducing information from this recording medium comprises the steps of irradiating one of the cells with a light beam, changing the wavelength of the light beam within a predetermined range including at least one wavelength at which multiple interference occurs between the first and second reflecting layers with respect to each cell, detecting the wavelength of light which has effected reflecting multiple interference, and reproducing information recorded in the cell in accordance with the wavelength detected.

The present invention in still another aspect pertains to an apparatus for reproducing information from an optical information recording medium having a base, first and second reflecting layers formed on the base parallel to and at a predetermined distance from each other, and an information storage layer which is formed between the first and second reflecting layers and which has an array of a plurality of calls having different refractive indices according to the recorded information, the apparatus comprising means for irradiating the medium with a light beam, means for changing the wavelength of the light beam within a predetermined range and at a predetermined rate, means for detecting the intensity of light reflected by or transmitted through the medium, means for detecting a peak value of the output from the intensity detecting means, means for measuring the time between a reference moment and the moment at which the peak value detecting means detects the peak value, means for reproducing the information from the time measured by the time measuring means, and means for relatively moving the medium and the light beam in the direction of the array of cells.

The present invention in yet another aspect pertains to an apparatus for recording/reproducing information by using an optical information medium having a base, first and second reflecting layers formed on the base parallel to and at a predetermined distance from each other, and a recording layer having reference cells and data cells and which is formed between the first and second reflecting layers and which is changed in its refractive index when irradiated with a light beam, the apparatus comprising a first light source for producing a first light beam for recording information, a modulation circuit for modulating the intensity of the light beam from the first light source in accordance with information to be recorded, a first optical system for converging the light beam from the first light system for converging the light beam from the first light source to the medium, a second light source for producing a second light beam for reproducing information, a second optical system for converging the light beam from the second light source to the medium, a drive circuit for changing the wavelength of the light beam from the second light source within a predetermined range and at a predetermined rate, a photodetector for detecting the intensity of light reflected by or transmitted through the medium, a peak detection circuit for detecting a peak value of a signal output from said photodetector, a clocking circuit for measuring the time between a reference moment and the moment at which the peak detection circuit detects the peak value, and an information reproduction circuit for reproducing the information from the time measured by the clocking circuit.

The present invention in still a further aspect pertains to a method of initializing an optical information recording medium having a base, first and second reflecting layers formed on the base parallel to and at a predetermined distance from each other, and a recording layer having reference cells and data cells and which is formed between the first and second reflecting layers and which is changed in its refractive index when irradiated with a light beam, the method comprising the steps of irradiating one or more cells of the recording layer with a reproducing light beam, changing the wavelength of the reproducing light beam within a predetermined range and at a predetermined rate. The predetermined range including at least one wavelength at which multiple interference occurs between the first and second reflecting layers with respect to each cell, detecting the intensity of light reflected by or transmitted through the medium, the intensity of light detected being peaked at the moment when the wavelength of the detected light becomes equal to the wavelength at which multiple interference occurs, measuring the time between a reference moment and the moment at which the peak value of the intensity is detected, comparing the time measured and a reference time, and irradiating one or more cells with a recording light beam having an intensity according to the result of the comparison to adjust the refractive index of the cell.

BRIEF DESCRIPTION OF THE DRAWINGS

FIGS. 4A to 4D are time charts of a first embodiment of an information reproduction method of the present invention;

FIGS. 9A to 9E are time charts of a sixth embodiment of the information reproduction method of the present invention;

DESCRIPTION OF THE PREFERRED EMBODIMENTS

Figure 1:
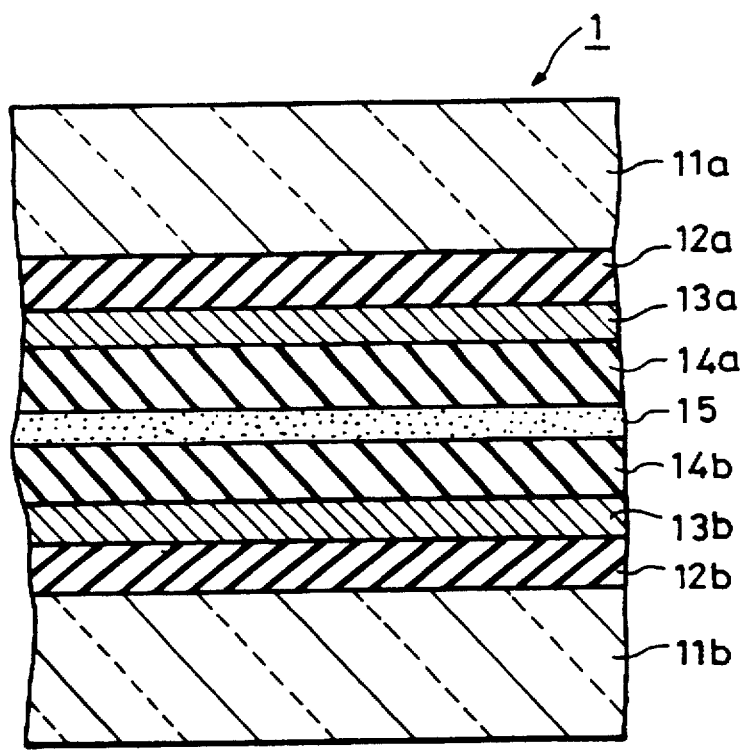
FIG. 1 is a schematic cross-sectional view of an embodiment of an optical information recording medium of the present invention.

FIG. 1 schematically shows a cross section of an optical information recording medium in accordance with an embodiment of the present invention.

The recording medium 1 shown in FIG. 1 has a double-sided structure and is capable of recording and reproduction on both the obverse and reverse sides. The recording medium 1 is composed of transparent polycarbonate bases 11a and 11b and reflecting layers and medium layers alternately formed on the bases, as described below. First reflecting layers 12a and 12b are formed on the bases 11a and 11b, respectively, and medium layers 13a and 13b whose refractive indices are changed by heat are formed on the surfaces of the reflecting layers 12a and 12b. Second reflecting layers 14a and 14b are formed on the medium layers 13a and 13b and are attached to each other by an adhesive layer 15. These layers are formed parallel to each other to cause multiple interference as described later.

Preferably, the medium layers 13a and 13b are formed of an inorganic medium, such as TeOx (x: positive integer), InSeTℓCo, GeTeSbTℓ or GeTsSe, or an organic medium, such as an anthraquinone dielectric, a dioxazine compound or a triphenodithiazine compound. The multilayer reflecting layers 12a, 12b, 14a and 14b are constructed by alternately superposing layers of dielectrics having large and small refractive indices and each having a thickness corresponding to ¼ of the wavelength of a later-mentioned light beam. $SiO_2$, $Si_3N_4$, $MgF_4$, $Al_2O_3$ and the like may be used as dielectric layer materials.

To manufacture this recording medium 1, the first reflecting layer, the medium layer and the second reflecting layer are successively formed by sputtering or coating on each of the bases 11a and 11b forming the two faces of the medium 1. These layers and the bases 11a and 11b are combined by bonding the second reflecting layers 2 to each other with an adhesive (adhesive layer 15), thus forming a recording medium for double side recording.

In the recording medium 1 in accordance with this embodiment, a Fabry-Pérot etalon is formed by the arrangement of the first and second layers and the medium layers interposed therebetween. Incident light is repeatedly reflected between the two reflecting layers so that a multiple interference effect is obtained, as described below. According to the present invention, this multiple interference effect is effectively utilized to perform multivalued information recording, as described below in detail.

The principle of information recording/reproduction using the above-described recording medium 1 will be described below with reference to FIGS. 2A and 2B.

Figure 2A:
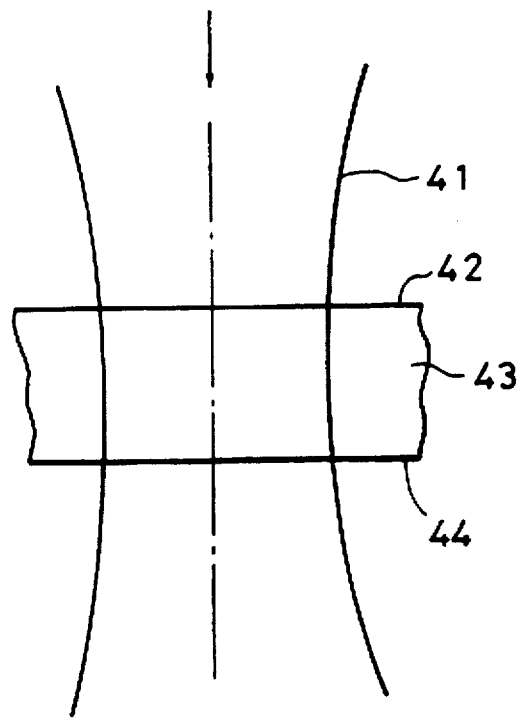
FIG. 2A is a schematic diagram of irradiation of the medium with a light beam.

In FIG. 2A, a reference number 43 denotes a medium layer which corresponds to each of the medium layers 13a and 13b shown in FIG. 1, and a reference number 42 denotes a first reflecting surface equivalently substituted for the first reflecting surfaces 12a and 12b of FIG. 1. Also a second reflecting surface 44 is equivalently substituted for the second reflecting layers 14a and 14b. A reference number 41 denotes a laser beam which is incident upon the medium layer 43 from above, i.e., from the base shown in FIG. 1. The waist of the laser beam is positioned in the vicinity of the medium layer 43 by the control of an autofocusing mechanism. Accordingly, the laser light can be regarded as substantially parallel rays.

To record information, a small converged spot of the light beam is irradiated to the medium so as to locally heat the medium layer 43. At this time, the intensity of the light beam is changed according to the information, and the information is recorded as an array of cells varying in refractive index in accordance with the change in the intensity.

To reproduce the information, a small converged spot of laser light is irradiated to the recording medium 1 by a pickup lens as in the case of the ordinary optical head. The information is reproduced from the light reflected by the array of cells.

Assuming, for ease of explanation, that air fills both the spaces on the upper and lower sides of the medium layer 43 of FIG. 2A, and that the reflectivities of the two reflecting surfaces are equal, this optical process can be discussed as a case of incidence of parallel light on a simplest Fabry-Pérot etalon. Accordingly, if the intensity reflectivity of the first and second reflecting surfaces is R; the refractive index of the medium layer 43 is $D_M$; and the thickness of this layer is α, the reflectivity $R_E$ of this etalon determined by the multiple interference effect of repeated reflection can be expressed by an equation(1):

$$R_E = \frac{F \sin^2 \frac{\psi}{2}}{1 + F \sin^2 \frac{\psi}{2}} \tag{1}$$

where F is expressed by the following equation (2), and ψ is a phase difference expressed by the following equation (3)

if the wavelength of the incident light is $\lambda$.

$$F = \frac{4R}{(1+R)^2} \quad (2)$$

$$\psi = \frac{4\pi n_M d}{\lambda} \quad (3)$$

F is a parameter corresponding to the fineness and representing the sharpness of interference fringes. If the reflectivity R is greater, the change in reflectivity with respect to the change in phase difference becomes steeper and greater by the effect of multiple interference of the reflected light, as described below with reference to FIG. 2B. That is, the recordable multivalued levels can be increased. The reflectivity is lowered when the following equation (4) obtained from equation (1) is satisfied.

$$\psi = 2\pi m \quad (4)$$

where m is an integer.

Figure 2B:
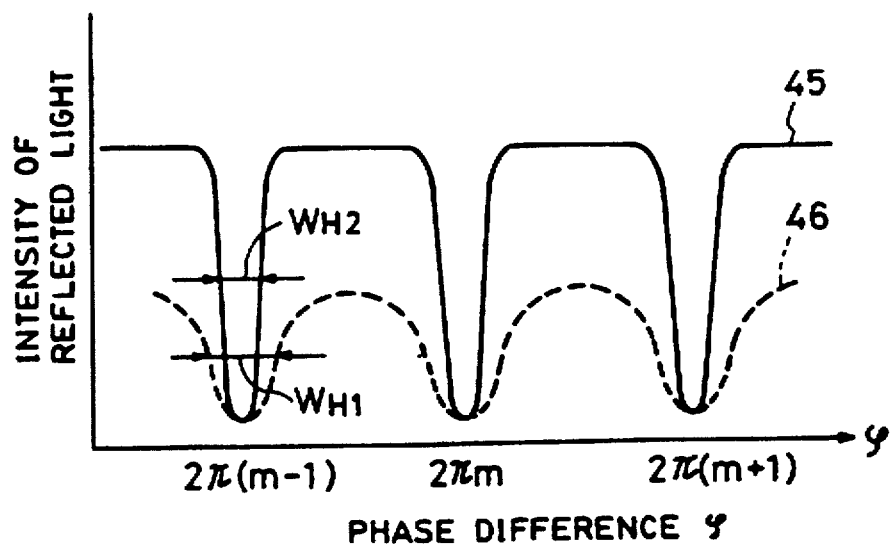
FIG. 2G is a diagram of the relationship between the phase difference and the intensity of reflected light with respect to the medium shown in FIG. 1.

FIG. 2B schematically shows the above-mentioned multiple interference. The abscissa represents the phase difference $\psi$ and the ordinate represents the intensity of reflected light. A dotted line 46 in FIG. 2B indicates a case where the reflectivity R is small, and a solid line 45 indicates a case where the reflectivity R is large. It is found that if the reflectivity is increased, the halfwidths of the reflection intensity change with respect to the phase difference, i.e., the widths indicated by $WH_1$ and $WH_2$ in FIG. 2B are reduced.

A change in the above-mentioned phase difference $\psi$ can be expressed by the following equation (5) from equation (3):

$$\Delta\psi = \frac{\partial \psi}{\partial n_M} \Delta n_M + \frac{\partial \psi}{\partial \lambda} \Delta\lambda + \frac{\partial \psi}{\partial d} \Delta d \quad (5)$$

According to this new multivalued recording method, multivalued information is converted into a refractive index change $\Delta n_M$ and is recorded as a phase difference $\Delta\psi$ on the medium. At the time t or reproduction, a range of wavelength of light is swept and the condition defined by equation (4) is restored at a wavelength corresponding to $\Delta\lambda$ which determines a phase difference just cancelling out the phase difference $\Delta\psi$ created by $\Delta n_M$. That is, when the range of wavelength is swept with respect to time, sharp interference fringes appear at a wavelength matching with the phase difference corresponding to the value of the recorded information, and pulses corresponding to the intensity changes shown in FIG. 2B are thereby obtained as a time waveform. When a wavelength of a laser light is swept within a range of wavelength $\lambda$ within a period t, pulses corresponding to $\Delta\lambda$ are obtained at at time $\Delta t$ after a start of wavelength sweeping. A position $\Delta t$ of these pulses on the time base indicates the multiple-value information. The correspondence between the refractive index, wavelength and time is expressed by the following equation (6) when the waveform sweep is linear.

$$\frac{\Delta n_M}{n_M} = -\frac{\Delta\lambda}{\lambda} = -\frac{\Delta t}{t} \quad (6)$$

At the time of the recording mentioned above, the change $\Delta\psi$ in the phase difference expressed by equation (5) is created by controlling $\Delta n_M$ caused by laser heating. At the time of reproduction, light having a variation in its wavelength which cancels out the change in phase difference is introduced and sharp dark fringes are detected. That is, as described above, the range of wavelength is swept, pulses observed as changes in the intensity of light reflected by the medium are detected, and the wavelength corresponding to this detection corresponds to the above phase difference.

Since the condition of the appearance of pulses is determined by equation (4), the corresponding wavelength is given by equation (3) and the wavelength satisfying the condition is, of course, discrete in correspondence with the waveform of FIG. 2B.

$$\lambda_m = \frac{2n_M d}{m} \quad (7)$$

It is therefore preferred that the change $\Delta\psi$ in the phase difference is a change from $\psi_m$ satisfying equation (4) as an initial value. If the initial value is greatly deviated from $\psi_m$, the extent of wavelength sweeping which is required before the appearance of pulses is considerably large, because it is necessary to cancel out the shift of the initial value from $\psi_m$ as well as $\Delta\psi$. From equation (7), $$\lambda_{m+1} - \lambda_m = \left(\frac{1}{m+1} - \frac{1}{m}\right) 2n_M d \quad (8)$$

in a most extreme case where the refractive index $n_M$ and the thickness d of the medium layer are reduced so that the interference fringe order m=1, that is, when the going-and returning optical path length $2n_M d$ is $1\lambda_1$ from equation (7), $$\lambda_2 - \lambda_1 = (\tfrac{1}{2}-1)2n_M d = -\tfrac{1}{2}\lambda_1 \quad (9)$$

is required to form an interference fringe of m=2. In this case, therefore, it is necessary to sweep the wavelength $\lambda_1$ to half wavelength $\tfrac{1}{2}\lambda_1$, and, if the initial value of the phase is at the middle of $\psi_2$ and $\psi_1$, it is necessary to sweep the wavelength by about 50%. Actually, however, if $n_M=5$ and d=0.6 μm, $\lambda_m=0.8$ μm when m=6 or, if d=1.0 μm, $\lambda_m=0.76$ μm when m=13. It is therefore possible to effect matching between the range of wavelength which can be swept in practice and the optical path length $n_M d$ of the medium, as described below. That is, the initial value $\psi_{INT}$ of the phase difference may be set so that, from equations (3) and 4), $$\psi_{INT} - 2\pi m = \frac{4\pi n_M d}{\lambda_m} \quad (10)$$

Also, the medium may be formed so that the optical path length is in the vicinity of $(n_M d)$ satisfying equation (11):

$$n_M d = m\frac{\lambda_m}{2} \quad (11)$$

To be exact, the meaning of setting in the vicinity of this value is as described below. Ordinarily, the change in refractive index caused by heating is either positive or negative depending upon the kind of medium. The initial value $(nM,d)_{INT}$ is previously shifted in accordance with the direction and range of change in refractive index after multiple-value information recording to conform to the direction and range of possible wavelength sweeping.

An example of an information recording/reproduction apparatus using the above-described optical information recording medium will be described below with reference to FIG. 3. The optical system shown in FIG. 3 includes a recording medium 1 on which multiple-value information is recorded as described above, a semiconductor laser 2 which is a first light source for recording information, a collimator lens 3 for making laser light from the semiconductor laser device 2 parallel, another semiconductor laser 4 which is a second light source for reproducing information, a collimator lens 5 for making laser light from the semiconductor laser 4 parallel, beam splitters 6 and 7, a pickup lens 8, a sensor lens 9, and a photodetector 10.

Beams of light converted into parallel light by the collimator lenses 3 and 5 are combined by the beam splitter 6. The medium 1 is driven by a motor (not shown) and is scanned with the light beam supplied from the light sources.

The recording semiconductor laser 2 is a laser having a comparatively large output and is driven by a recording laser derive drive circuit 31. Words represented by multiple-bit (e.g., 8-bit) binary signals are successively input through a terminal 30. Input words are previously converted into corresponding signal levels in a modulation circuit 32 in accordance with a predetermined table. For example, if each word consists of 8 bits, there are 256 types of words, and a recording signal modulated to 256 levels in correspondence with those words is output from the modulation circuit. These recording signals are input into the recording laser drive circuit 31, and the semiconductor laser 2 outputs a recording beam having intensities in accordance with the levels of the signals.

The recording beam is made parallel by the collimator lens 3, transmitted through the beam splitters 6 and 7, and converged as a small spot on the medium layer of the medium 1. The medium layer is heated by being irradiated with this recording beam so that the signal is recorded as a sequence of small recording regions changed in reflectivity. The small recording regions have refractive indices corresponding to the intensities of the irradiated light beam. That is, one word is recorded in one recording region. Outputting the signal from the modulation circuit 32 is effected in certain cycles based on a clock signal output from a clock signal generation circuit 33. Accordingly, the small recording regions are formed on the recording medium 1 at equal pitches in the beam scanning direction.

A laser having a comparatively small output is used as the reproducing semiconductor laser 4. The semiconductor laser 4 is driven by a semiconductor laser drive circuit 34. The semiconductor laser drive circuit 34 sweeps the wavelength of the reproducing beam output from the semiconductor laser 4 in certain cycles in synchronization with the clock signal supplied from the clock signal generation circuit 33. This wavelength sweeping can be performed by using, for example, an ordinary double hetero structure (DH) laser and by changing a current injected into this laser. If a tandem electrode type variable wavelength semiconductor laser proposed in Japanese Patent Laid-Open No. 63-32985 and so on is employed, it is possible to increase the range and the speed of sweeping. The clock signal generation circuit 33 synchronizes the small recording regions of the medium with the clock signal by, for example, detecting synchronization marks previously recorded on the medium. On the basis of the clock signal, the semiconductor laser 4 is controlled so as to effect wavelength sweeping at least one time within each recording region.

The reproducing beam output from the semiconductor laser 4 is reflected by the beam splitter 6, transmitted through the beam splitter 7 and converged as a small light spot on the medium layer of the medium 1. Light reflected at the medium so as to be modulated in accordance with the recorded information is separated from the incident light from the laser by the beam splitter 7, condensed by the sensor lens 9, and received by the photodetector 10.

An output from the photodetector 10 is input into a peak detection circuit 35, and a peak of the detection signal is detected therein. A clocking circuit 36 measures, based on the clock signal supplied from the clock signal generation circuit 33, the time between the time point at which wavelength sweeping with the reproducing beam is started and the time point at which a detection signal peak is detected.

In accordance with the present invention, as described later, information recorded as changes in the refractive index of the medium layer of the medium 1 is detected by utilizing the optical multiple interference effect, i.e., by being converted into changes in wavelength at which point multiple interference occurs. In the apparatus shown in FIG. 3, the wavelength is swept at a certain rate, and each change in wavelength therefore appears as an elapse of time from the start of sweeping. Accordingly, an information reproduction circuit 37 reproduces the information from the times measured by the clocking circuit 36 and outputs the reproduced information through a terminal 38.

The light spot focus positions of the recording light beam and the reproducing light beam are controlled three-dimensionally by autofocusing/autotracking control, although the means for this control is not illustrated. The optical outputs from the above-mentioned two semiconductor lasers elliptically distributed may be converted by a beam shaping prism or the like so as to be generally circularly distributed.

In the above-described recording/reproduction apparatus, multiple-value information is recorded by heating the medium with the light from the recording semiconductor laser 2 so that the refractive index $n_M$ thereof is changed. In accordance with the present invention, changes in the refractive index are recorded in correspondence with changes in the phase difference of the etalon unlike the conventional method based on the principle of recording utilizing changes in reflectivity caused by changes in the refractive index. For reproduction, the wavelength of the reproducing semiconductor laser 4 is swept, and changes in the wavelength corresponding to the recorded phase difference changes are detected as changes of optical pulses with respect to time by the photodetector 10.

FIGS. 4A to 4D are diagrams of timing of an information reproducing operation based on wavelength sweeping described above. FIG. 4A shows the state of arrangement of small recording regions (hereinafter referred to as cells) in the direction of a track on the recording medium 1. In this example, cells Ci (i=1, 2 . . . ) are arranged in a row in the direction of a track at equal pitches spatially or with respect to time. Cells referred to herein correspond to pits of compact disks or domains of opto-magnetic disks and are basically those used for conventional mark interval recording or mark length recording. That is, the distance between the cells and the length of the cells are unrelated to recorded information.

FIG. 4B shows a waveform 16 of sweeping the wavelength of the reproducing semiconductor laser 4, the abscissa representing the time, the ordinate representing the wavelength. The wavelength sweeping waveform 16 is a saw-tooth waveform as illustrated, and has a linear time-wavelength relationship. The wavelength can therefore be detected by measuring the time, so that the construction of the reproduction system can be simplified. FIG. 4C shows the intensity of reflected light used for reading the information from the cells shown in FIG. 4A with a light beam wavelength-swept like the waveform 16 of FIG. 4D, i.e., an waveform 17 output from the photodetector 10. Pulses shown in FIG. 4C are output at wavelengths cancelling recorded phase difference $\Delta\psi$, and correspond to pulses shown in FIG. 2. The times at which the pulses are output are $t_{ci}$ (i=1, 2, 3). These times indirectly represent wavelengths. The time $t_i$ (i=1, 2, 3) of wavelength $\lambda_s$ corresponding to the initial value is also obtained. The wavelength satisfying the equation of the interference fringe condition (6) with respect to each cell can be obtained by calculating $\Delta t = t_{ci} - t_i$. The recorded phase differences and changes in refractive index can be obtained by using equations (3) and (6) to reproduce the recorded multiple-value information. FIG. 4D shows a pulse waveform 18 formed from $L_i$ and $t_{ci}$. Each pulse width $\Delta t$ represents multiple-value information recorded in each cell.

As shown in FIG. 4B, the effective range of wavelength sweeping is $\lambda s \leq \lambda \leq \lambda c$. That is, since the change in wavelength is steep and unstable in the vicinity of peaks and troughs of the wavelength sweeping waveform 16, some marginal portions of the sweeping wavelength range are not used. In this embodiment, a recording medium whose refractive index is reduced by heating is used, the wavelength corresponding to the initial value $n_{MINT}$ of the refractive index and satisfying the equation of the interference fringe condition (1) is $\lambda s$, and an equation:

$$n_{MINT} d = m \cdot \lambda_s / 2 \qquad (12)$$

is satisfied. The change in phase difference caused by heating is, from equations (3) and (5), $$\Delta \psi = \frac{4 \pi d}{\lambda_m} \Delta n_M \qquad (13)$$

with respect to $\lambda_m$. Therefore the phase difference after heating is, from equations (10) and (13), $$\psi' = \psi_{INT} + \Delta \psi = \frac{4 \pi d}{\lambda_m} (n_{MINT} + \Delta n_M) = \frac{4 \pi d}{\lambda_m} n_M' \qquad (14)$$

A wavelength $\lambda_m$, which cancels this change in phase difference and at which another peak of interferences fringes appears is, from equations (3) and (4), $$2 \pi m = \psi' = \frac{4 \pi n_M' d}{\lambda_m'} \qquad (15)$$

The change in wavelength is, from equations (11) and (15), $$\Delta \lambda_m = -\frac{2d}{m} \Delta n_M \qquad (16)$$

having a sign opposite to that of $\Delta n_M$, as can also be understood from equation (7). The wavelength with respect to the maximum $|\Delta n_M|$ is $\lambda_e$. Consequently, it is possible to cancel out the maximum reduction $|\Delta n_M|$ at $\lambda_e$ during heating recording by setting $n_{MINT}$, d, and $\lambda s$ as initial values.

Thus, the recording medium has a refractive index and a thickness selected to satisfy the condition $n_{MINT} d = m \cdot \lambda_s / 2$ so that the initial value $\psi_{INT} = 2 \pi m$ by considering the direction of change of the refractive index with respect to the wavelength sweeping range $\lambda_s \leq \lambda < \lambda_e$, i.e., the range of refractive index changes $n_{MINT} \leq n_M \leq n_{Me}$. The need for an unnecessary wavelength sweep is thereby eliminated and the process of reproducing multiple-value information can be optimized. In the above-described embodiment, a reflection type of recording medium is used but, needless to say, a transmission type recording medium is also applicable. If a transmission type medium is used, the photodetector 10 shown in FIG. 3 is arranged to receive light transmitted through the medium 1.

Figures 5A, 5B, 5C:
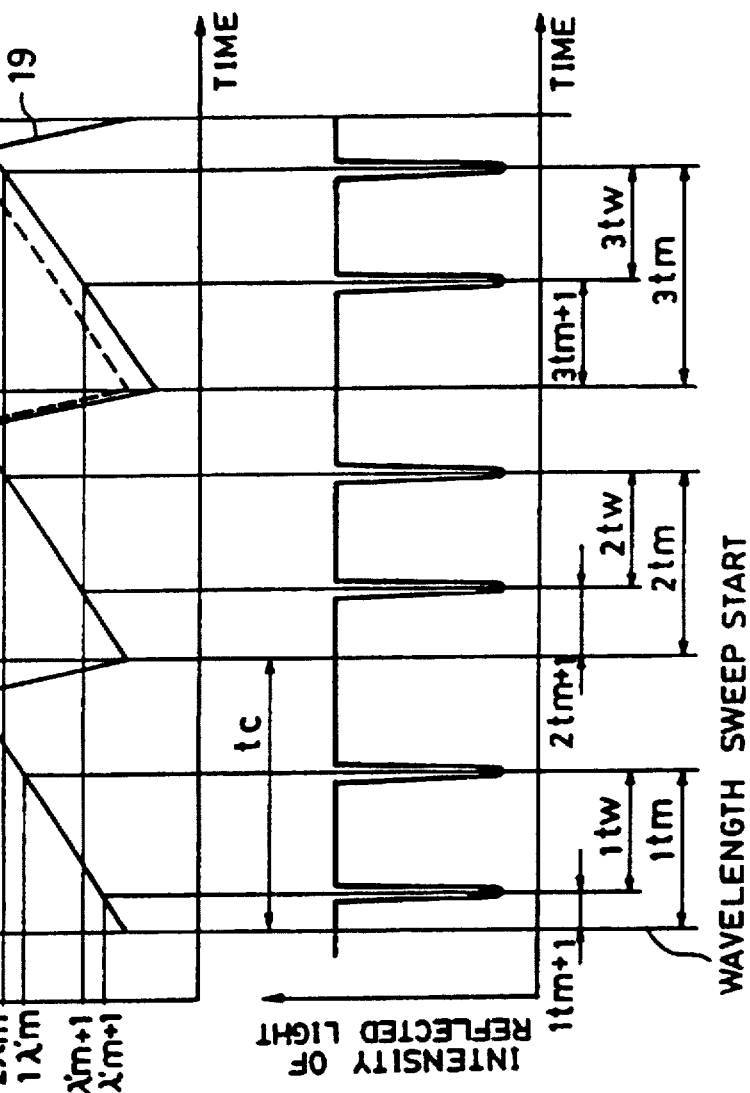
FIGS. 5A to 5C are time charts of a second embodiment of the information reproduction method of the present invention.

FIGS. 5A to 5C are time charts of a second embodiment of the information reproduction method of the present invention. A medium and an apparatus constructed as shown in FIGS. 1 and 3 are also used in this embodiment. This embodiment is arranged so that the range of wavelength sweeping of reproducing light includes two wavelengths at which multiple interference occurs. This method makes it possible to reduce jitter as described later and to reproduce information with improved reliability even if the absolute value of the reproducing light wavelength varies.

FIG. 5A schematically shows an array of cells of recording medium 1. FIG. 5B shows a waveform of sweeping the wavelength of reproducing semiconductor laser 4. This waveform is a saw-tooth waveform such that the wavelength is swept linearly in synchronization with the pitch of each cell. The time $t_c$ is a time for reading of each cell. Information items in the cells are successively read out. The waveform indicated by a solid line 19 in FIG. 5B is a sweeping waveform in a case where the wavelength at which wavelength sweeping is started is shifted at the time of reading from the third cell $c_3$, and the waveform indicated by a broken line 20 is a normal sweeping waveform free from any wavelength shift.

FIG. 5C shows the intensity of reflected light from the etalon when the information is read out of the cells with a light beam wavelength-swept as shown in FIG. 5B. The photodetector 10 outputs a corresponding waveform.

Reading from the first cell $C_1$ will be described below with specific reference to FIG. 5C. In this case, two pulses which correspond to a value of multiple-value information appear respectively times $_1 t_{m+1}$, and $_1 t_m$ after the moment at which wavelength sweeping is started. The reproducing wavelengths at these times are $_1 \lambda'_{m+1}$ and $_1 \lambda'_m$ as indicated in FIG. 5B. From equations (3) and (4), if $\lambda'_m = _1 \lambda'_m$, and $\lambda'_{m+1} = _1 \lambda'_{m+1}$ at the peak positions of the two pulses with respect to the medium having the refractive index changed by $\Delta n_m$ for recording, the following equations (17) to (20) are satisfied:

$$\psi'_m = \psi_m + \Delta \psi_m \frac{4 \pi}{\lambda'_m} d(n_M + \Delta n_M) = \frac{4 \pi}{\lambda'_m} d n'_M \qquad (17)$$

$$\psi'_{m+1} = \psi_m + \Delta \psi_{m+1} = \frac{4 \pi}{\lambda'_{m+1}} d(n_M + \Delta n_M) = \frac{4 \pi}{\lambda'_{m+1}} d n'_M \qquad (18)$$

$$\psi'_m = 2 \pi m \qquad (19)$$

$$\psi'_{m+1} = 2 \pi (m + 1) \qquad (20)$$

That is, the two pulses correspond to interference fringes of the orders m and m+1. The wavelength difference therebetween is expressed by equation (20) from equations (17) and (20):

$$\lambda'_m - \lambda'_{m+1} = \frac{2 n'_M d}{m} - \frac{2 n'_M d}{m+1} = \frac{2 n'_M d}{m(m+1)} = \frac{\lambda'_m \lambda'_{m+1}}{2 n'_M d} \qquad (21)$$

These equations are of course established before the change of $\Delta n_M$, i.e., with respect to $\psi_m$, $n_M$, and $\lambda_m$. In equations (17 to (20), the conditions of equations (19) and (20) are satisfied by providing a wavelength change $\Delta \lambda_m$ cancelling the change $\Delta n_M$ of the new $n'_M$. If $\lambda'_m = \lambda_m + \Delta \lambda_m$, that wavelength change corresponds to the refractive index change $\Delta n_M$ obtained by equations (22) and (23):

$$\Delta \lambda_m = \frac{2 d \Delta n_M}{m} - \lambda_m \frac{\Delta n_M}{n_M} \qquad (22)$$

$$\Delta \lambda_{m+1} = \frac{2 d \Delta n_M}{m+1} = \lambda_{m+1} \frac{\Delta n_M}{n_M} \qquad (23)$$

If the wavelength sweeping is linear with respect to time, and if the sweeping rate is "a", the relationship defined by the following equation (24) is satisfied by a change in the pulse position due to the refractive index change $\Delta n_M$, which change is expressed by the following equations (25) and (26):

$$\Delta\lambda = a\Delta t \quad (24)$$

$$\Delta t_m = \frac{1}{a} \lambda_m \frac{\Delta n_M}{n_M} \quad (25)$$

$$\Delta t_{m+1} = \frac{1}{a} \lambda_{m+1} \frac{\Delta n_M}{n_M} \quad (26)$$

Accordingly, a change $\Delta t_w$ in the distance $t_w$ between the peaks of two pulses is expressed by and equation (27) from equation (21). The pulse interval change $\Delta t_w$ is expressed by the relative value, i.e., the difference between the two wavelengths and is, hence, expressed by the order alone.

$$\Delta t_W = \Delta t_m - \Delta t_{m+1} = \frac{1}{a} \frac{\Delta n_M}{n_M} (\lambda_m - \lambda_{m+1}) - \frac{1}{a} \frac{2d\Delta n_M}{m(m+1)} \quad (27)$$

Consequently, it is possible to reproduce the given phase difference, i.e., recorded information by detecting the pulse interval $t_w$ and by calculating the change $\Delta t_w$.

Information recorded in the cell $C_2$ is different from that in the cell $C_1$, and two pulses for the cell $C_2$ appear at times $_2t_m$ and $_2t_{m+1}$ different from those in the case of the cell $C_1$, i.e., at different wavelengths $_2\lambda'_m$ and $_2\lambda'_{m/1}$. the change $\Delta t_w$ in the pulse interval expressed by equation (27) is also different. Thus, recorded multiple-value information can be detected from the time distance between the two pulses.

The next cell $C_3$ has the same recorded information as the cell $C_2$, but a wavelength sweeping waveform 19 is shifted from a normal waveform 20 as shown in FIG. 5B. Accordingly, the wavelengths $_2\lambda'm$ and $_2\lambda'_{m+1}$ at which two pulses appear are the same as those in the case of the cell $C_2$ but the times $_3t_m$ and $_3t_{m+1}$ are different from $_2t_m$ and $_2t_{m+1}$ of $C_2$. That is, if the waveform of sweeping the wavelength of the reproducing semiconductor laser 4 is dispersed, the positions of pulses corresponding to information are also dispersed. For example, in the case of a reproduction method wherein the absolute value of the pulse generation time from the wavelength sweeping start time corresponds to the absolute wavelength $\lambda'_m$ cancelling the recorded phase difference $\Delta\psi_m$, the dispersion of the wavelength sweeping waveform directly appears as jitter components of pulses, so that the reliability of data is reduced.

In contrast, if information is reproduced based on the time interval between two pulses as in the case of the embodiment of the present invention, there is no variation in the change $\Delta t_w$ even if the absolute value of the wavelength is shifted as in the case of the waveform 19 shown in FIG. 5C, provided that the rate a of wavelength sweeping, i.e., the inclination is not changed, since $\Delta t_w$ is determined by the relative difference between two wavelengths as expressed by equation (27). It is therefore possible to reproduce information without reducing the reliability of the reproduced information, even when the wavelength of the reproducing laser is shifted.

For multivaluing of, for example, 8 bits per cell in accordance with the present invention, multiple-value information of 256 levels is recorded on the medium as mentioned above, and the necessary resolution is 1/256 or higher. In this case, assuming that $n_M=5$; the resolution of $n_M$ is $10^{-4}$; the range of $n_M$ is $3\times10^{-2}$; the thickness $d=0.6$ μm; and, if orders m=6 and m+1=7 are used, $\lambda_m=0.80$ μm $\lambda_{m+1}=0.69$ μm from equations (17) to (20), the resolution and range of these wavelength are about 0.2 nm and 5 nm, as determined from equation (6). If the electrical time resolution is 10 nsec., the range is about 2.6 μsec (about 400 kHz). The wavelength sweeping rate a is about 40 nm/μsec. If $d=1.0$ μm and m=13, the wavelength sweeping width is reduced as $\lambda_m=0.76$ μm and $\lambda_{m+1}=0.71$ μm. If the cell size is 1 μm, the relative speed of the spot and the medium is about 0.4 m/sec., lower than that of ordinary optical disks by one place. However, since 8-bit information is recorded in one cell, the transfer rate is about 3 Mbps. Accordingly, if the time resolution and the wavelength sweeping speed are improved, the degree of multivaluing and the transfer rate can be further increased.

At the falling portions of the wavelength sweeping waveform 19 shown in FIG. 5B, short pulses are also generated at the corresponding wavelengths, which pulses, though not illustrated, appear in the waveform shown in FIG. 5C. However, such pulses can easily be removed by using a filter for filtering the output from the photodetector 10 or by inserting a gate operating in synchronization with the rise and fall of the sweeping waveform.

In the above-described embodiment, two pulses are detected with respect to one cell, but the number of pulses is not limited to two. The intervals between three or more pulses may be detected. In such a case, it is possible to use the two intervals of pulses corresponding to arbitrary orders as well as the interval of pulses of successive orders to reproduce information, and a plurality of pulse intervals may be combined for a further improvement in reliability.

Figures 6A, 6B:
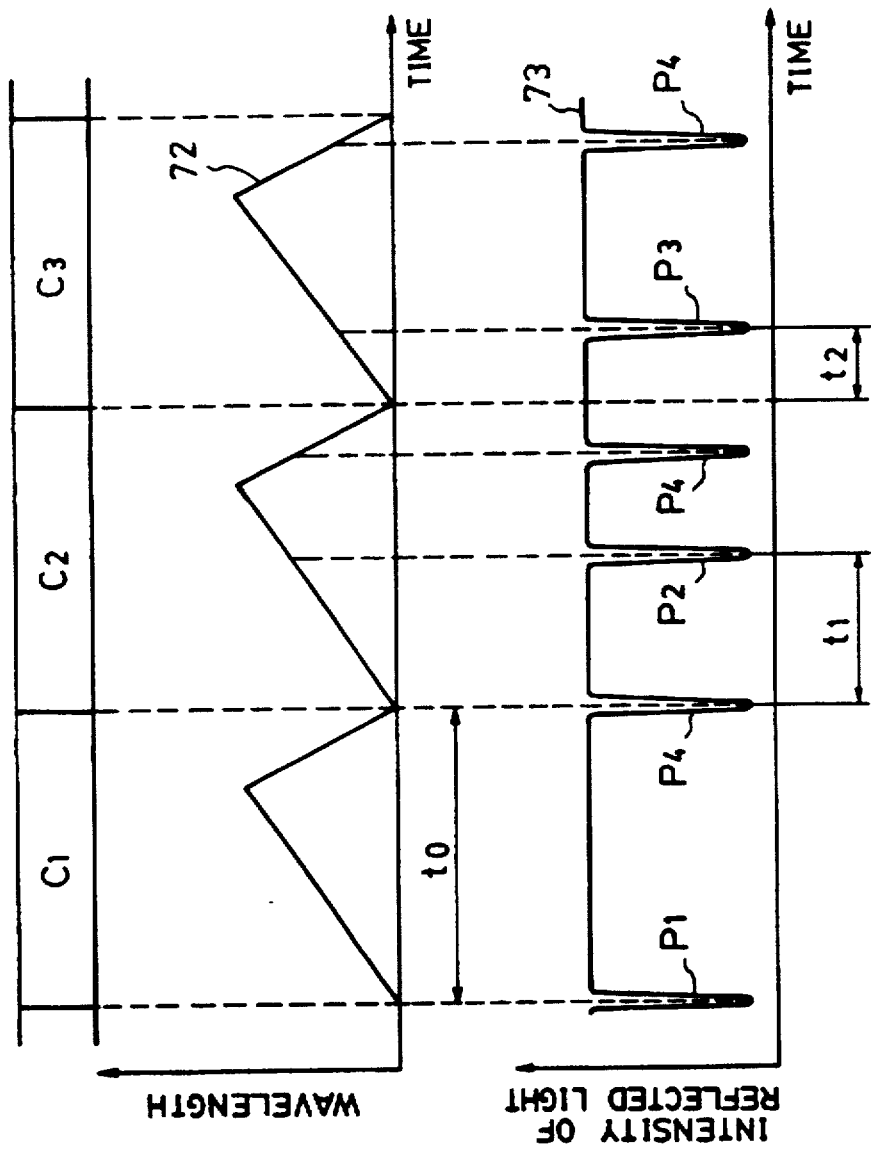
FIGS. 6A and 6B are time charts of a third embodiment of the information reproduction method of the present invention.

FIGS. 6A and 6B are time charts of a third embodiment of the information reproduction method of the present invention. A medium and an apparatus constructed as shown in FIGS. 1 and 3 are also used in this embodiment. In this embodiment, the wavelength of the reproducing light is changed with respect to the outgoing and returning paths. Each of the operations of sweeping from a shorter wavelength to a longer wavelength and sweeping from the longer wavelength to the shorter wavelength is effected one time during transmission of the reproducing light through one cell.

FIG. 6A shows a waveform of sweeping the wavelength of reproducing semiconductor laser 4. Time $t_0$ is a time for reading one cell. $C_1$ to $C_3$ indicate cells defined as small recording regions arranged in the direction of a track. Information items in the cells are successively read out. Information is reproduced in the rising range of a saw-tooth wave 72 shown in FIG. 6A. The wavelength is swept by this saw-tooth wave so that the relationship between the time and the wavelength is linear, thereby simplifying conversion of wavelengths. An operation of converting wavelength information into times is adopted as well as the specific process of the present invention in which recorded phase difference information is converted into wavelengths, thereby enabling the reproduction system to be simplified.

A waveform 73 shown in FIG. 6B is an example of the waveform of reflected light from the etalon in a case where information is read out of the cells by the wavelength sweeping waveform shown in FIG. 6A, i.e., an example of the waveform output from the photodetector 10. With respect to the first cell $C_1$, a pulse $P_1$ appears which corresponds to an initial wavelength $\lambda$ at a low reflectivity, i.e., a sharp dark fringe of the etalon, satisfying equation (4). Since the time between the moment at which the wavelength sweeping saw-tooth wave starts rising and the moment at which the pulse peak appears is 0 sec., this period of time is measured to detect the state in which the wavelength is $\lambda$, that is, wavelength change $\Delta\lambda=0$, phase difference change $\Delta\psi=0$, and refractive index variation $\Delta n_M=0$.

In reading the second cell $C_2$, the moment at which the peak of pulse $P_2$ appears is delayed by $L_1$ from the moment at which the saw-tooth wave starts rising. The wavelength $\lambda_1$ of the reproducing laser can easily be obtained since the sweeping is linear, and $\Delta\lambda=\lambda_1-\lambda$. Then, a phase difference variation $\Delta\psi'$ can be obtained by the following equation:

$$\Delta\psi' = -\frac{4\pi n_M' d}{\lambda^2} \Delta\lambda = -\frac{4\pi n_M d}{\lambda^2} \Delta\lambda - \frac{4\pi d}{\lambda^2} \Delta n \Delta\lambda \cong -\frac{4\pi n_M d}{\lambda^2} \Delta\lambda \quad (28)$$

Assuming that $\Delta\psi - \Delta\psi'$ from equations (13) and (28), the relationship expressed by the following equation is established:

$$\frac{\Delta\lambda}{\lambda} = -\frac{\Delta n}{n_M} \quad (29)$$

That is, it is possible to detect low-reflectivity peaks with the detector by shifting the wavelength by $\Delta\lambda$.

Getting with the refractive index variation $\Delta n_M$ is effected based on the above-mentioned equations (13) and (14). With respect to the third cell $C_3$, time $t_2$ before the appearance of a pulse $P_3$ is measured and the corresponding wavelength, phase and refractive index are obtained in the same manner. The refractive index of the medium layer is changed in accordance with multiple-value information so that the multiple-value information is recorded as phase difference. For reproduction of the multiple-value information, the phase differences are converted into changes in wavelength to obtain a high-contrast signal, and detection of wavelengths is converted into detection pulses on the time base, thereby enabling enabling the system to be simplified.

The relationship between the change in the refractive index of the medium and the final change in wavelength is given as equation (29). Further, the inclination of the rising portion of the saw-tooth wave 72 shown in FIG. 6A is given as equation (30), and the equation (29) is then expressed by equation (31).

$$a = \frac{\lambda}{t} \quad (30)$$

$$\frac{\Delta n_M}{n_M} = -\frac{\Delta\lambda}{\lambda} = -\frac{\Delta t}{t} \quad (31)$$

Thus, the relationship between the change in refractive index given as multiple-value information and the time interval given as multiple-value information is obtained. For multivaluing of, for example, 8 bits per cell, multiple-value information of 256 levels is recorded on the medium as mentioned above, and the necessary resolution is 1/256 or higher. Assuming that the refractive index is 4; and resolution of the refractive index is $10^{-4}$; and the range is $3 \times 10^{-2}$, the corresponding wavelength resolution and range are about 0.2 nm and 5 nm, respectively, with respect to $\lambda = 830$ nm, as determined from equation (31). If the electrical time resolution is 10 nsec., the range is about 2.56 μsec (about 400 kHz), and the wavelength sweeping rate is about 2 nm/μsec as determined from equation (30). If the cell size is 1 μm, the relative speed of the spot and the medium is about 0.4 m/sec., lower than that of ordinary optical disks by one place. However, since 8-bit information is recorded in one cell, the transfer rate is about 3 Mbps. Optical power necessary or recording is small according to the small relative speed. Needless to say, if the time resolution and the wavelength sweep speed are improved, the degree of multivaluing and the transfer rate can be further increased.

As shown in FIG. 6B, short pulses $P_4$ are generated at falling portions of the saw-tooth wave of FIG. 6A, because each cell is read during both going and returning of wavelength sweeping. However, such pulses may be removed by using a pulse gate circuit or the like to avoid occurrence of problems.

Figures 7A, 7B:
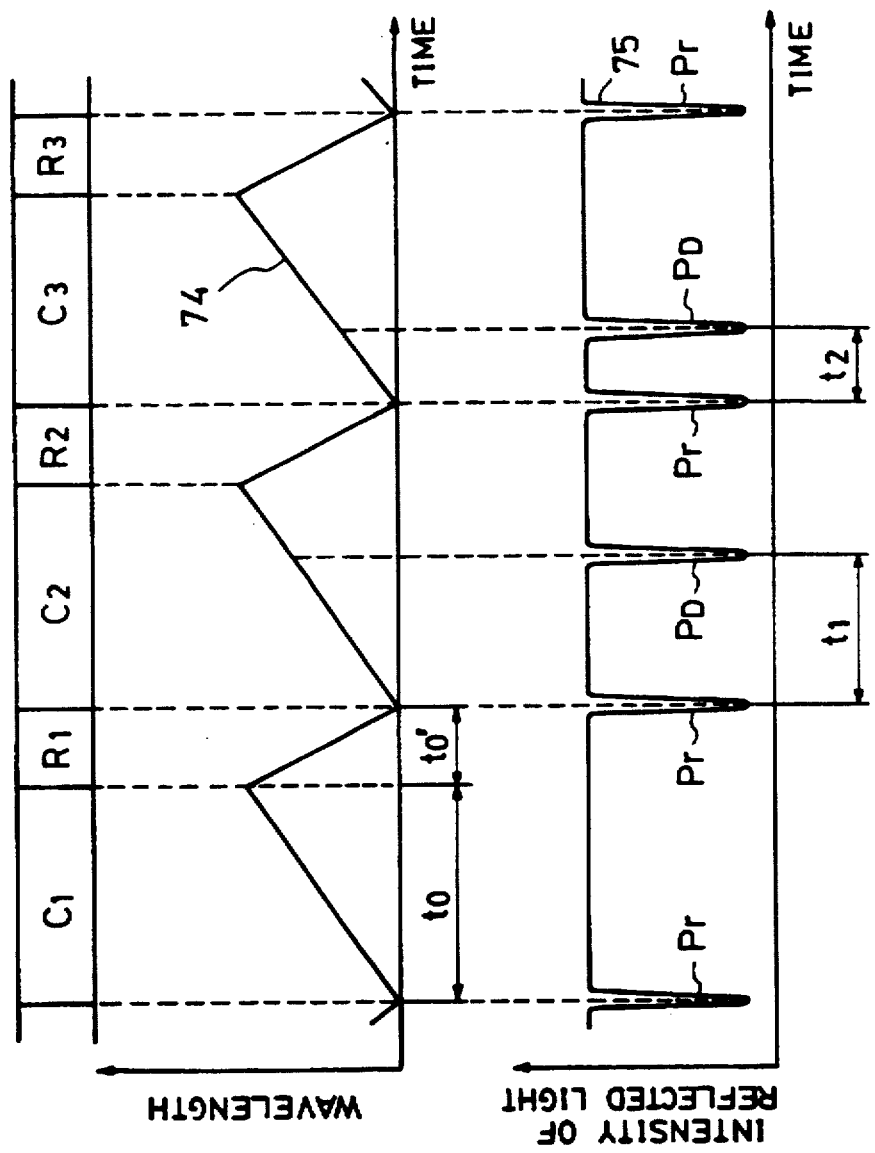
FIGS. 7A and 7B are time charts of a fourth embodiment of the information reproduction method of the present invention.

FIGS. 7A to 7B are time charts of the reproducing operation of a fourth embodiment of the information reproduction method of the present invention.

In this embodiment, certain spacings are provided between recording cells to solve the above-mentioned problem of crosstalk and to set a reference for multiple-value information. Non-recording regions, i.e., regions in which the initial refractive index is maintained are defined in the spacings. In FIG. 7A, such non-recording regions are shown as regions $R_1$ to $R_3$. In this embodiment, for reproduction of information each information cell is read during the time $t_0$ for rising of the corresponding one of saw-tooth waves 74 shown in FIG. 7A, and each of reference cells provided between the information cells is read during the time $t_0'$ for falling of the wave. A reference pulse $P_r$ corresponding to initial information (e.g., denoting naught) is thereby obtained at the wavelength corresponding to the end of each saw-tooth wave, as indicated in a waveform 75 shown in FIG. 7B. Then, times $t_1$ and $t_2$ between these pulses and information pulses $P_D$ are detected to enable correction of indefinite factors including dispersions of mediums, a spatial dispersion in one medium, a change with time, and a dispersion of the wavelength of the reproducing semiconductor laser 4. In this embodiment, the reliability of data can be improved remarkably although the recording density is reduced to some extent.

Figures 8A, 8B:
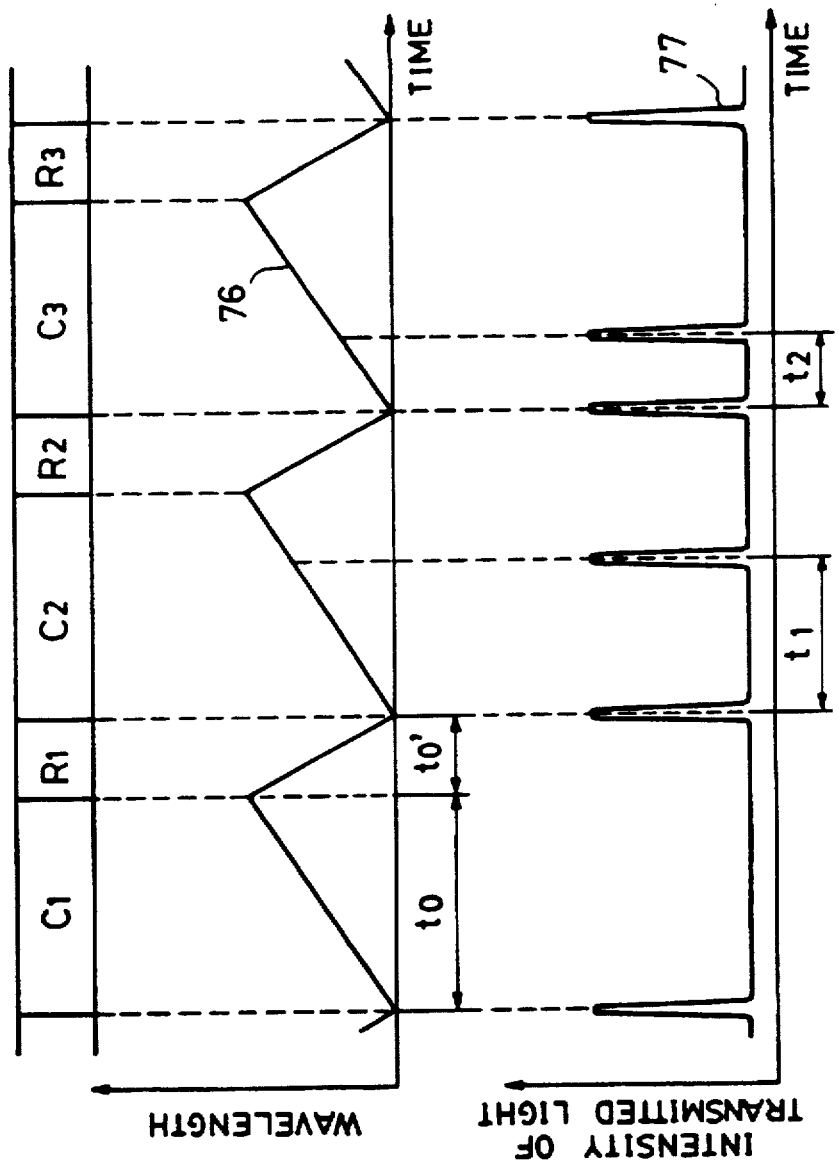
FIGS. 8A and 8B are time charts of a fifth embodiment of the information reproduction method of the present invention.

FIGS. 8A and 8B shown a fifth embodiment of the information reproduction method the present invention in which the method described with reference to FIGS. 7A and 7B is applied to a transmission type medium.

If a transmission type medium is used, the complicacy of the apparatus is increased to some extent because of, e.g., a specific arrangement relating to the disposition of the detector and the movement of the detector in synchronization with the optical head. However, upward pulses such as those indicated in a transmission waveform 77 shown in FIG. 8B are basically advantageous in terms of errors due to medium defects, because defects of the medium, scratches, particles, contamination and the like usually absorb or scatter the light and cause downward pulse waveforms in the output from the detector. Other characteristics are the same as the above-described embodiments.

FIGS. 9A to 9E are time charts of a sixth embodiment of the information reproduction method of the present invention. A medium and an apparatus constructed as shown in FIGS. 1 and 3 are also used in this embodiment. In this embodiment, reference cells in which reference information is recorded are provided between cells in which data is recorded.

FIG. 9A shows the arrangement of cells in the direction of a track on the recording medium 1. In this example, cells Ci and reference cells Ri are arranged alternately.

Reference cells Ri are thus provided between information cells Ci, and are defined as regions where the initial refractive index is maintained to obtain a reference value for multiple-value information. It is thereby possible to reduce non uniformities of the thickness and the refractive index of the recording medium caused by a change with time or a temperature change, or to jitters due to dispersions of the thickness and the refractive index caused at the time of manufacture, and to thereby improve the error rate.

FIG. 9B shows a waveform 22 of sweeping the wavelength of reproducing semiconductor laser 4, the abscissa representing the time, the ordinate representing the wavelength. The wavelength sweeping waveform 22 is a saw-tooth wave swept with respect to each of information cells Ci and reference cells Ri. The relationship between the time and the wavelength is made linear by using such a saw-tooth wave for wavelength sweeping. The wavelength can therefore be detected by measuring the time, thus simplifying the wavelength detection. Also, an operation of converting wavelength information into times is adopted as well as the specific process of the present invention in which recorded phase difference information is converted into wavelengths, thereby enabling the reproduction system to be further simplified.

FIG. 9C shown a waveform 23 of the intensity of reflected light from the etalon, i.e., a waveform output from the photodetector 10 when a spot of a light beam whose wavelength is changed in accordance with the waveform 22 is scanned in the direction of arrangement of the cells. The abscissa represents the time while the ordinate represents the intensity of reflected light (the value of output from the photodetector 10). The initial value is recorded in each reference cell Ri as described above. The etalon has a low reflectivity (sharp dark fringe) at the wavelength $\lambda=\lambda_R$ such as to satisfy equation (4). Pulses therefore generate at the wavelength $\lambda-\lambda_R$, as shown in FIG. 9C. The times at which these pulses generate are $t-t_{Ri}-t_{Ri}'$. With respect to each information cell Ci, a pulse is generated at the wavelength $\lambda$ cancelling the recorded phase difference $\Delta\psi'$ in accordance with equations (28) and (29). The time at which this pulse is generated is $t=t_{Ci}$.

The wavelength shift $\Delta\lambda=\lambda_{Ci}-\lambda_R$ can be obtained by detecting $\Delta t=t_{Ci}-t_{Ri}'$, or $\Delta t_i=t_{Ci}-t_{Ri}$ or $\Delta t_i=t_{Ri+1}-t_{Ci}$. The correspondence between the recorded phase difference $\Delta\psi'$ and the refractive index change $\Delta n_M$ is then determined to reproduce the recorded information. However, the change in the wavelength of the reproducing semiconductor laser 4 is steep in regions in the vicinity of the peaks and troughs of the saw-tooth wave, and stability of the wavelength is low in these regions. Moreover, the peak and trough points correspond to the boundaries between the information cells and the reference regions, and the crosstalk from the information cell is large at each point. For this reason, the reference times $t_Ri$ and $t_{Ri}'$ obtained from the reference cells are easily dispersed so that jitters in the reproduced signal are increased.

FIGS. 9D and 9E are diagrams of a method proposed to solve this problem. FIG. 9D shows a waveform 24 of sweeping the wavelength of reproducing semiconductor laser 4, and FIG. 9E shows a waveform 25 of an output from the photodetector 10 (the intensity of reflected light) at the time of scanning in accordance with the waveform 24. In this embodiment, as is clear from FIG. 9D, the wavelength sweeping range is increased so that the reference wavelength $\lambda_R$ is included in the wavelength sweeping range. By this wavelength sweeping, the reference wavelength $\lambda_R(t=\tau_{Ri})$ at which reference pulses are output correspond to a generally central position in each reference cell. That is, the reference pulses are output not at the boundaries between the cells but in the range corresponding to the reference cell regions, and the desired data can be read from regions of the reference cell where the influence of the crosstalk from the information cells is small. From the information cells Ci, pulses ($t=\tau_{Ci}$) corresponding to the recorded information are obtained, and multiple-value information in which jitters are limited can be reproduced by calculating $\Delta\tau=\tau_{Ci}-\tau_{Ri}$ or $\Delta\tau=\tau_{Ri+1}-\tau_{Ci}$. In the method of FIG. 9D and 9E, there is a need to increase the range of wavelength sweeping in comparison with method of FIGS. 9A and 9B, and the wavelength sweeping rate or the reading time is therefore increased to some extent. This method, however, enables an improvement in the reliability of information reproduction.

Figures 10A, 10B, 10C:
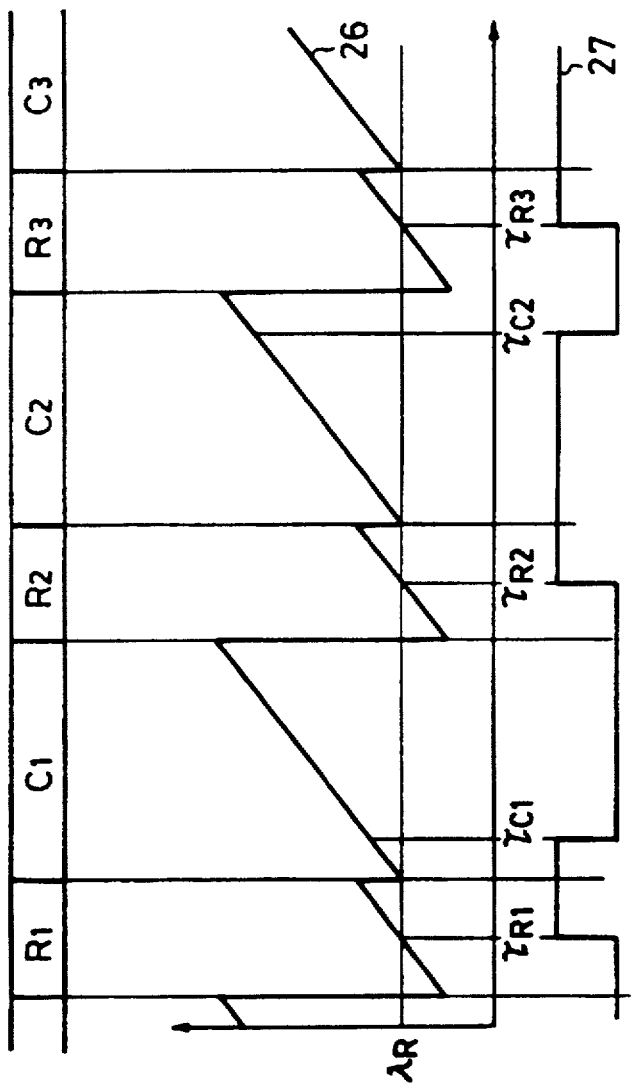
FIGS. 10A to 10C are time charts of a seventh embodiment of the information reproduction method of the present invention.

FIGS. 10A to 10C are time charts of a seventh embodiment of the information reproduction method of the present invention. A medium and an apparatus constructed as shown in FIGS. 1 and 3 are also used in this embodiment.

The embodiment of FIGS. 9 is arranged to increase both the wavelength sweeping rate and range, but the characteristics of this sweeping is mainly determined by the wavelength sweeping characteristics of the reproducing semiconductor laser 4. For this reason, in some cases, it is difficult to increase both the rate and range. The embodiment shown in FIGS. 10A to 10C is arranged to solve this problem. In this embodiment, it is not necessary to increase the sweeping rate, while extension of the wavelength sweeping range is required.

FIG. 10A shows the arrangement of information cells Ci and reference cells Ri on recording medium 1. This arrangement is the same as those of the above-described embodiments. FIG. 10B shows a waveform 24 of sweeping the wavelength of reproducing semiconductor laser 4. The wavelength at which sweeping for the information cells is started and the wavelength at which sweeping for reference cells is started are different. That is, with respect to reference cells Rj, sweeping is effected so that the middle point of the wavelength sweeping range correspond to reference wavelength $\lambda_R$. A reference pulse is thereby output when the center of each reference cell Ci is scanned (time $t=\tau_{Ri}$). It is thereby possible to reduce the crosstalk from the information cells and to reproduce the reference signal in a sweeping range where the stability of the wavelength is high. With respect to information cells Ci, the same wavelength sweeping as that shown in FIG. 9D is effected according to the range of the multiple values of the recorded information. The effective wavelength sweeping time of this wavelength sweeping can be extended in comparison with that of the sweeping shown in FIG. 9D. Correspondingly, the accuracy with which information cell pulses are detected can be improved.

FIG. 10C shows a signal waveform 27 obtained from pulses formed by reading the information from the cells with a wavelength-swept light beam. The rise of the signal waveform 27 corresponds to $\tau_{Ri}$ obtained from reference cell Ri, and the fall corresponds to $\tau_{Ci}$ of multiple-vale information obtained from information cell Ci. Consequently, the information can be reproduced from $\Delta t=\tau_{Ci}\tau_{Ri}$ or $\Delta t=\tau_{Ri/1}-\tau_{Ci}$. That is, since pulses at $\Delta t$ represent the information, the information can be reproduced from each cell by the above-described operations. To be exact, some shifts, e.g., variations in the reference cell size and time-lags are included in $\Delta t$, and the multiple-value information is reproduced bases on equations (3) and (31) while correcting such shifts.

Figure 11:
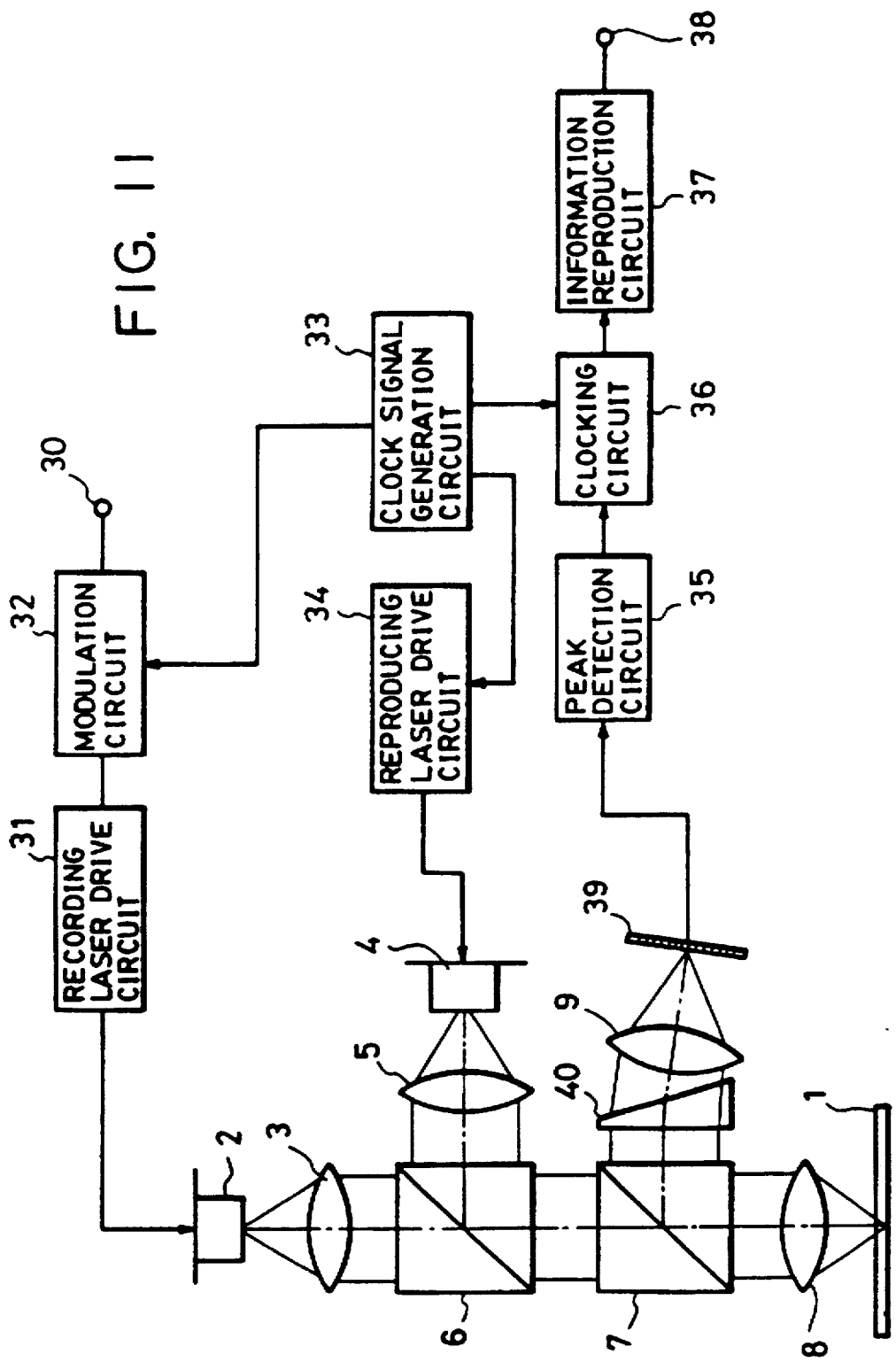
FIG. 11 is a schematic diagram of a second embodiment of the optical information recording/reproduction apparatus used in accordance with the present invention.

FIG. 11 is a schematic diagram of a second embodiment of the optical information recording/reproduction apparatus in accordance with the present invention. In FIG. 11, the same components as those shown in FIG. 3 are indicated by the same reference characters, and the description for them will not be repeated.

Figure 3:
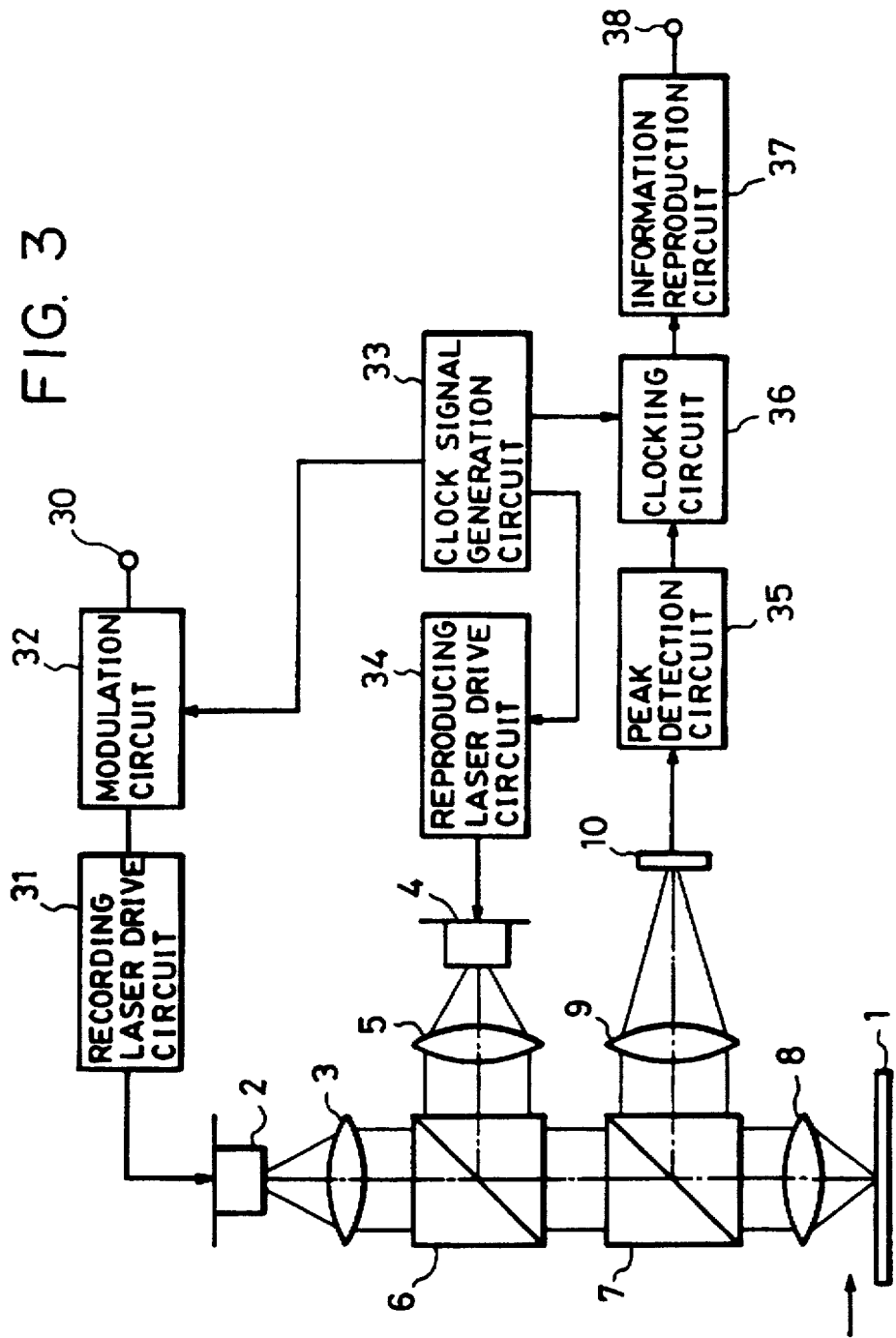
FIG. 3 is a schematic diagram of a first embodiment of an optical information recording/reproduction apparatus used in accordance with the present invention.

The apparatus shown in FIG. 11 is different from the embodiment shown in FIG. 3 in that a dispersing prism 40 is placed in front of the sensor lens 9, and that the photodetector 10 is replaced with a unidimensional charge-coupled device (CCD).

In this embodiment, the light receiving system is constituted by a spectroscopic system so that the wavelength is spatially developed and separated. Occurrence of jitters is thereby prevented even if the wavelength sweeping waveform varies, as explained later.

FIGS. 12A to 12F are diagrams of an eighth embodiment of the information reproduction method of the present invention using the apparatus shown in FIG. 11.

Figures 12A, 12B, 12C, 12D, 12E, 12F:
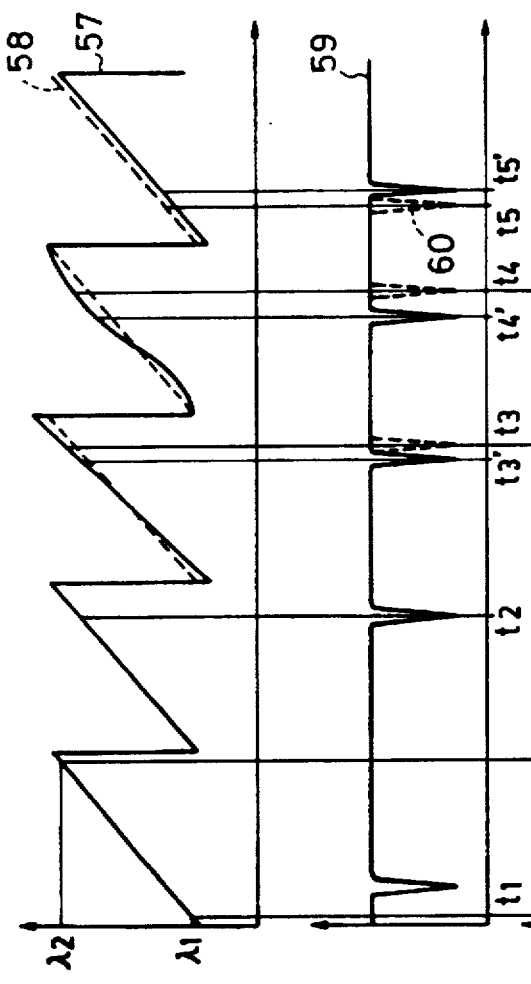
FIGS. 12A to 12F are time charts of a eight embodiment of the information reproduction method of the present invention.

FIG. 12A shown the state of arrangement of cells in the direction of a track on the recording medium 1.

FIG. 12B shows a waveform of sweeping the wavelength of reproducing semiconductor laser 4, the abscissa representing the time, the ordinate representing the wavelength. In FIG. 12B, a wavelength sweeping waveform 57 having a variation in the inclination, a non-linear undulation and a parallel shift is illustrated along with an ideal wavelength sweeping waveform 58 indicated by the broken line. A saw-tooth wave is used as the wavelength sweeping waveform 57. This is because it is a simplest and convenient sweeping wave, and because, since the relationship between the time and the wavelength is linear, the wavelength density per unit time is constant so that the wavelength can be distributed generally uniformly when dispersed by a spectrograph. The effective range of wavelength sweeping is set as $\lambda s \leq \lambda \leq \lambda e$. Some marginal portions of the sweeping wavelength range in the vicinity of the minimum and maximum wavelengths are not used.

FIG. 12C shows changes in the intensity of reflected light from the recording medium 1 when the information on the medium is read out with a light beam wavelength-swept by waveforms 57 and 58, the abscissa representing the time, the ordinate representing the intensity of reflected light. The line 50 represents the intensity of reflected light at the time of reading with the light beam swept by the wavelength sweeping waveform 57, and the line 60 represents the intensity of reflected light at the time of reading with the light beam swept by the ideal sweeping waveform 58. Pulse-like changes are caused in the intensity of reflection light at the wavelengths cancelling the recorded phase differences $\Delta \psi(t=t_i)$. These pulses correspond to interference fringes such as those shown in FIG. 2B. If the wavelength varies as in the wavelength sweeping waveform 57 at the time of reading of cells $C_3$, $C_4$, and $C_5$, the times at which optical pulses appear are $t_3'$, $t_4'$, and $t_5'$ which are shifted from the correct pulse appearance times, thereby causing jitters.

FIG. 12D shows an example of a drive with a unidimensional CCD 39. To reduce crosstalk between the cells, an exposure time texp shorter than the time for scanning each cell Ci is set. FIG. 12E shows a waveform 22 of an output from the unidimensional CCD 39. The abscissa represents the time, while the ordinate represents the voltage. There are variations in the angle at which the light incident upon the dispersing prism 40 is dispersed at the wavelength changing with time. If this angle is θ(1); and the focal length of the sensor lens 10 is f, the position x on the imaging plane, i.e., on the unidimensional CCD 39 is expressed by $$x = f\theta(\lambda) \quad (32)$$

When the change ˆθ(λ) in the angle due to wavelength change Δλ is small, Δθ(λ)αΔλ can be established. Then, $$\Delta X \alpha f \Delta \lambda \quad (33)$$

Thus, the face of the unidimensional CCD 39 is scanned with a light spot by wavelength sweeping. This scanning is repeated for each of the cells Ci shown in FIG. 12A. Scanning with the reproducing light spot over each cell Ci on the recording medium 1 is based on the relative mechanical movement between the medium and the light spot (optical axis), and scanning with the light spot over the unidimensional CCD 39 is effected purely spectroscopically. There is therefore no crosstalk between these scannings in theory and, hence, no cause of jitters.

In more detail, the spatial position of the wavelength on the unidimensional CCD 39, i.e., the number of bits on the array sensors of the unidimensional CCD 39 is definitely fixed according to the relationship expressed by equations (32) and (33). Even if the time position of the interference fringe pulses in the reflected light intensity 59 fluctuates, the position of the wavelength on the unidimensional CCD 39 is not changed and the output from the unidimensional CCD 39 does not fluctuate, as shown as an output waveform 62. A reproduction signal free from jitters can therefore be obtained. FIG. 12F shows a pulse waveform 63 obtained from the output from the unidimensional CCD 39 shown in FIG. 12E, which waveform indicate positions of the wavelengths corresponding to the interference fringes. The width of each pulse represents multiple-value information recorded in the corresponding cell.

Figure 13A:
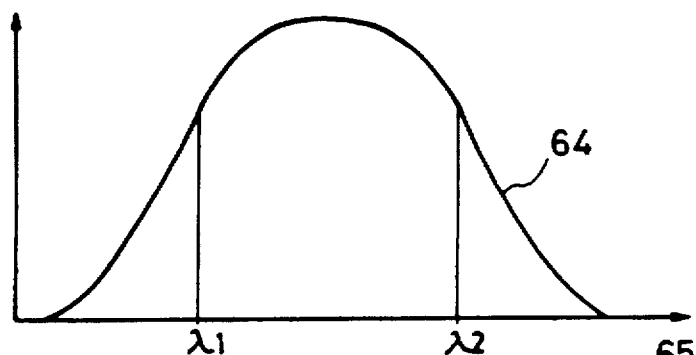
FIGS. 13A to 13C are time charts of a ninth embodiment of the information reproduction method of the present invention.
Figure 13B:
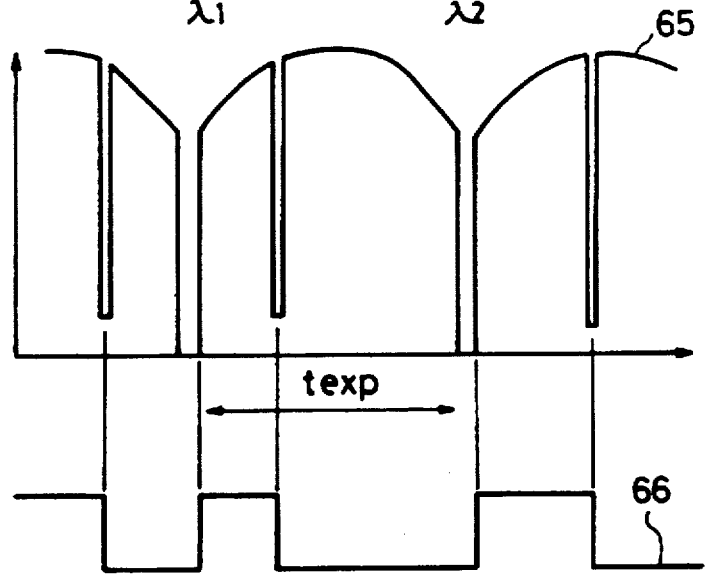
Figure 13C:

FIGS. 13A to 13C are diagrams of a ninth embodiment of the information reproduction method of the present invention using the apparatus shown in FIG. 11.

In the above-described embodiments, the range of wavelength of light from the light source is swept to detect wavelengths at which interference fringes occur. In contrast, in this embodiment, a reproducing light source having a spectrum width corresponding to that wavelength range is employed without effecting wavelength sweeping. Since there is no need for wavelength sweeping, the construction of the apparatus can be simplified. As a reproducing light source, a light emitting diode (LED) or a white light source is used instead of the reproducing semiconductor laser 4 shown in FIG. 11. However, it is necessary for the light source to have a sufficiently large spectrum width in order to obtain the desired spectrum width. A band-pass filter for transmission of the desired spectrum may be interposed between the light source and the beam splitter 6. In this arrangement, there is no need to modulate the wavelength of the light source. The light source may be driven by a DC current. In a case where this type of reproducing light source is used, reflected light from the recording medium 1 is dispersed by the dispersing prism 40 as in the case of the above embodiment, and its spectrum is developed on the unidimensional CCD 39 by the sensor lens 9.

FIGS. 13A to 13C are diagrams of the information reproducing operation of this embodiment. FIG. 13A shows the spectrum of the light source, the abscissa representing the time, the ordinate representing the intensity of light. FIG. 13B shown an example of a waveform 65 of the output from the unidimensional CCD 39, the abscissa representing the time, the ordinate representing the voltage. The dispersing prism 40 and the unidimensional CCD 39 are disposed and adjusted so that light having wavelengths out of the necessary range $\lambda_1 \leq \lambda \leq \lambda_2$ is inhibited from being incident upon the unidimensional CCD 39. In this embodiment, as well as the above embodiment, the number of elements of the unidimensional CCD 39 may be selected in accordance with the degree of multivaluing, e.g., at least 256 bits when 256 levels are required. If in this case spatial sampling is effected superfluously by one wavelength, i.e., N bits per level, the accuracy can be further improved. However, the resulting resolution is limited to the resolution determined by the dispersing prism 40 and the sensor lens 9. The spectral distribution selected with respect to the exposure time texp of the unidimensional CCD 39 appears in the output waveform 65. Interference fringes such as those shown in FIG. 2B exist at wavelengths cancelling recorded phase differences, and corresponding pulses are generated. FIG. 13C shown a pulse waveform 66 which indicates the positions of wavelengths corresponding to the interference fringes and which is obtained from the output waveform shown in FIG. 13B. As in the case of the above embodiment, each pulse width represents multiple-value information of the corresponding cell. Accordingly, the multiple-value information can be reproduced by measuring the pulse width.

In this embodiment, the spatial coherence and the time coherence of the light source are ordinarily inferior in comparison with the above embodiment, so that the light spot on the medium is substantially large. There are therefore a possibility of a reduction in spatial resolution and a possibility of a deterioration in visibility of interference fringes. However, since there is no need to sweep the wavelength of the light source, the construction of the apparatus can be remarkable simplified.

In the above embodiments, a dispersing optical system is used which includes a dispersing prism, a sensor lens, and a unidimensional CCD. However, this is not exclusive and, for example, a grating can be used in place of the dispersing prism. The grating may be a phase type grating for improving the efficiency of diffraction at a certain order or may be a reflection type grating. It is possible to simplify the apparatus or reduce the size of the apparatus by using a dispersing prism having an imaging function. It is also possible to adopt a recessed surface grating, a grating lens, a hologram or the like. A unidimensional CCD has been described as a sensor but the senor is not limited to this, and a split photodiode having an array of elements or a two-dimensional sensor array can of course be used.

In the above-described apparatus or method of the present invention, if a spatial thickness non-uniformity $\Delta d$ of the medium is included in the phase difference $\Delta \psi$ expressed by equation (5), it finally appears as a jitter pulse component and may cause an error, resulting in a reduction in reliability and a deterioration of the high-density recording performance.

According to the present invention, a recording medium having such a thickness non-uniformity $\Delta d$ can be changed into a recording medium improved in reliability by initialization described below.

The change in phase difference due to thickness non-uniformity $^\wedge d$ is expressed by the following equation (34) from equation (3).

$$\psi + \Delta \psi = \frac{4\pi n_M}{\lambda} (d + \Delta d) = \frac{4\pi n_M}{\lambda} d' \tag{34}$$

where $d'=d+\Delta d$. In accordance with the present invention, a phase difference is provided as a change in refractive index such as to cancel out this phase difference non-uniformity, thereby enabling the medium to be uniformly initialized so that the phase difference is made uniform. A change $\Delta\psi'$ in phase difference due to a change $\Delta n_M$ in refractive index is expressed by equation (28) from equation (34). Accordingly, from equations (28) and (34) and $\Delta\psi-\Delta\psi'$, equation (35) is obtained:

$$\frac{\Delta d}{d} = -\frac{\Delta n_M}{n_M} \tag{35}$$

That is, $\Delta n_M$ satisfying equation (35) is given to cancel out $\Delta d$.

To record multiple-value information, the medium is heated by the light from the recording semiconductor laser 2 so that its refractive index $n_M$ is changed. In accordance with the present invention, the change in refractive index is recorded in correspondence with the change in the phase difference of the etalon unlike the conventional method based on the principle of recording using a change in reflectivity due to a change in refractive index. For reproduction, the change in wavelength corresponding to the change in phase difference is detected.

In this embodiment, the change in refractive index $\Delta n_M$ cancelling out the thickness non-uniformity $\Delta d$ expressed by equation (35) is given by heating with recording laser to initialize the medium. It is to be noted here that, ordinarily, thickness non-uniformity $\Delta d$ is dispersed to positive and negative values while refractive index change $\Delta n_M$ created by heating is either positive or negative. Accordingly, to obtain the initial value $(n_M'd')$int satisfying the condition (4), which is given by the following equation (36), the value of $n_M d$ is previously shifted, during the manufacture process, to the minus or plus direction with respect to equation (36) according to plus/minus of the change in refractive index caused by heating.

$$(n_M'd')_{int} = m \frac{\lambda_{int}}{2} \tag{36}$$

As is apparent from the above explanation, the present invention enables not only correction of thickness non-uniformity $\Delta d$ but also correction of refractive index non-uniformity $\Delta n_M$. For example, a recording medium in which the change in refractive index caused by heating is positive may be manufactured by using, as a target value, a value of $n_M d$ obtained by deducting a value equal to or greater than the total minus deviation of $\Delta(n_M d)$ including dispersions of various conditions at the time of manufacture and the influence of changes with time.

The variation due to $\Delta(n_M d)$ is expressed by the following equation (37) if $\Delta\lambda-0$ in equations (3) and (5).

$$\Delta\psi = \frac{4\pi}{\lambda} (n_M \Delta d + d\Delta n_M) \tag{37}$$

This is cancelled out by the phase change Dy' due to the change in refractive index, i.e., Dy' obtained by the following equation (38) Then, from Dy=-Dy', DnM' is obtained by the following equation (39). DnM' may be created by heating.

$$\Delta\psi = \frac{4\pi}{\lambda} d'\Delta n_M' \cong \frac{4\pi}{\lambda} d\Delta n_M' \tag{38}$$

$$\Delta n_M' = -\frac{1}{d} (n_M \Delta d + d\Delta n_M) \tag{39}$$

The phase difference $\Delta\psi$ to be corrected can be detected with the reproduction system of the optical head shown in FIG. 3.

Figures 14A, 14B, 14C:
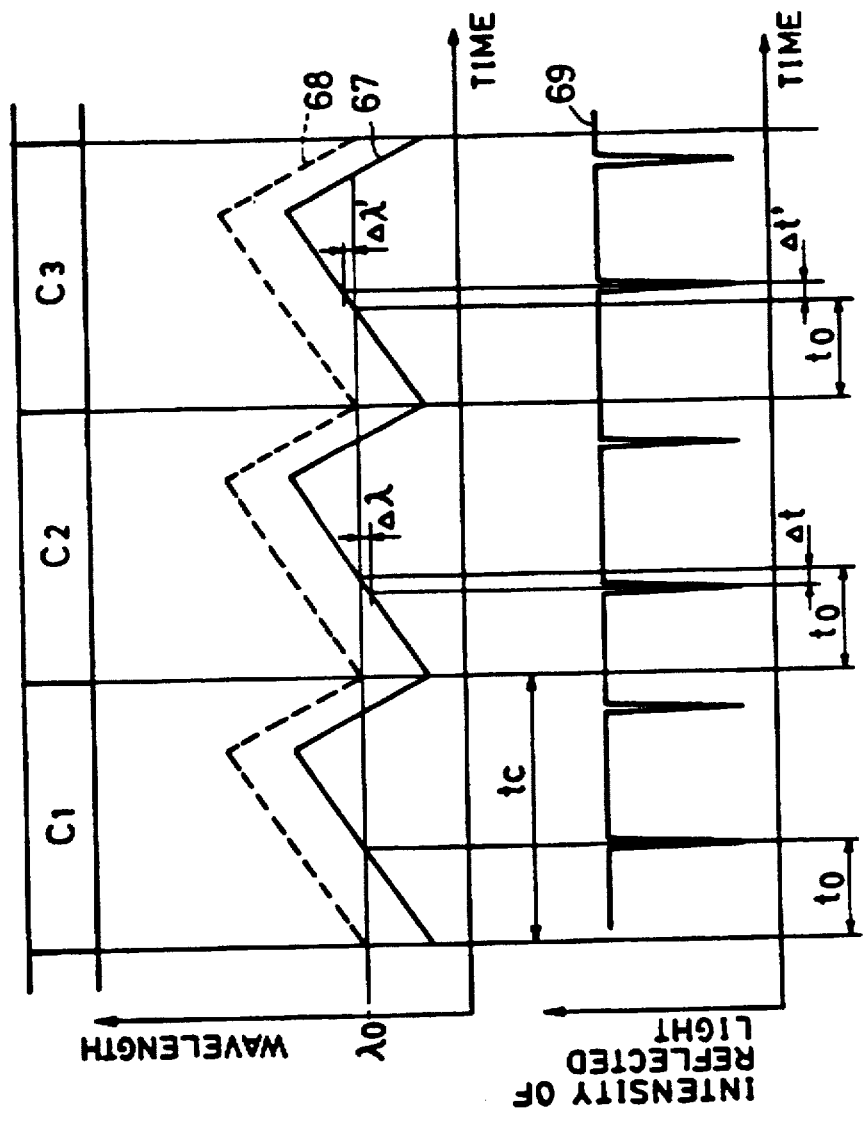
FIGS. 14A to 14C are time charts of an operation for detecting phase difference.

FIGS. 14A to 14C are time charts of the operation of detecting $\Delta\psi$.

FIG. 14A shows a waveform of sweeping the wavelength of the reproducing semiconductor laser 4. A solid line 67 indicates a waveform used for detection of $^\wedge\psi$ to be corrected, and a broken line 68 indicates a waveform used for ordinary multiple-value information reproduction. Time $t_c$ shown in FIG. 14A is a time for reading each cell, and information items are successively read from cells $C_1$ to $C_3$.

At the time of ordinary reproduction, the saw-tooth wave for wavelength sweeping is started at wavelength $\lambda_0$ satisfying the condition (4), as indicated by the broken line 68. At the time of initialization, for detection of phase $\Delta\psi$ to be corrected, the saw-tooth wave covering wavelengths on both sides of $\lambda_0$ as indicated by the solid line 67 is used because $\Delta\psi$ may be positive or negative as mentioned above. That is, the waveform 68 is shifted in a direction of wavelength to effect wavelength sweeping as indicated by the solid line 16.

FIG. 14B shows an example of the waveform of the intensity of reflected light from the etalon when information is read from each cell with a light beam wavelength-swept a shown in FIG. 14A. Changes in the intensity of reflected light are exhibited as pulses in a waveform 69. The output from the photodetector 10 corresponds to this waveform. With respect to the first cell $C_1$, $\psi=0$ in equation (37), $\lambda=\lambda_0$, and the condition (4) is satisfied. A pulse corresponding to that shown in FIG. 2B is generated at time $t_0$ at which $\lambda=\lambda_0$. $\lambda=\lambda_0$ is also established at a falling portion of the saw-tooth wave and a pulse is thereby generated. In this case, this pulse is ignored and is not used. With respect to the second cell $C_2$, $\Delta\psi\neq0$ in equation (37), $\Delta n_M$ or $\Delta d$ exists, and the condition (4) is not satisfied when $\lambda=\lambda_0$ but satisfied when $\lambda=\lambda_0-\Delta\lambda$. A pulse is therefore generated at $t=t_0-\Delta t$. $\Delta\lambda$ is determined from $\Delta t$, $\Delta\psi$ is obtained, and $\Delta n_M{}'$ used to correct it is calculated. The relationship therebetween is given by equations (6) and (39). Conversely, with respect to the third cell $C_3$, the condition (4) is satisfied when $\lambda=\lambda_0+\Delta\lambda'$, and a pulse is generated at $t=t_0+\Delta t'$.

By this detection operation, necessary refractive index change $\Delta n_M{}'$ for correcting phase difference non-uniformity is obtained for initialization. The corresponding cell is heated in accordance with this value by laser heating using the recording semiconductor laser 2, thereby removing the phase difference non-uniformity of the medium. Thus the medium can be uniformly initialized.

More specifically, in the case of a disk-like medium, phase difference non-uniformities of the necessary regions (tracks or sectors) are detected with reproducing semiconductor laser 4 and are stored in a memory. Then, the regions are initialized with recording semiconductor laser 2. In a simplest case, the operation may be such that a phase difference non-uniformity of a track to be corrected is detected during one revolution of the disk and is stored in a buffer or the like, and this track is initialized during the second revolution. If necessary, the result of initialization is verified during the third revolution to improve the reliability. These steps are repeated to complete initialization of the whole surface.

It is possible to effect initialization during one revolution by performing steps of spatially shifting the reproducing light spot and the recording light spot in the direction of tracks, detecting, by the leading reproducing spot, a phase difference to be corrected, and effecting initialization by the trailing recording spot.

For ease of explanation, the method has been explained on the assumption that the phase difference non-uniformity $\Delta\psi$ expressed by equations (37) and (38) should be reduced to 0. In accordance with the present invention, however, it is essential to reduce the non-uniformity of the medium due to $\Delta n_M$ and $\Delta d$ caused during manufacture or by changes with times, and it is not specifically necessary to establish $\Delta\psi=0$. The initial value may be set to a phase difference such that $\Delta\psi=-\Delta\psi'=$constant and such that equation (39) is satisfied irrespective of places. This is particularly effective in a situation where the direction of dispersions of thickness non-uniformity $\Delta d$ or refractive index non-uniformity $\Delta n_M$ with respect to a target value is indefinite so that the phase difference non-uniformity $\Delta\psi$ in accordance with equation (37) is either positive or negative as mentioned above, while refractive index change $\Delta n_M$ caused by laser heating is either positive or negative. For example, if the problem of compatibility is considered, it is not always advantageous to make the initial value $\lambda_{int}$ expressed by equation (36) and the reading start wavelength $\lambda_0$ shown in FIG. 14A coincide with each other because of differences between lots of mediums, materials and recording/reproduction apparatuses. For example, this is true in a case where laser wavelength sweeping characteristics are particularly unstable at an initial rising stage. In such a case, the reference position of reproduction pulses may be shifted with respect to the rise of the sweeping waveform. The present invention, however, is not influenced by such a condition.

Erasable mediums are included in the mediums listed above as refractive index changeable mediums. However, needless to say, any medium is applicable in accordance with the present invention irrespective of the erasable type and the post-writing types. In the case of the erasable type, the present invention may be applied to re-initialization of the medium after erasion of information recorded on the medium to improve the reliability of information.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of reproducing information stored in an optical information recording medium having a base, first and second reflecting layers formed on the base parallel to and at a predetermined distance from each other, and an information storage layer which is formed between the first and second reflecting layers and which includes an array of a plurality of cells, each cell having a refractive index of a different value corresponding to multiple-value information stored therein, said method comprising the steps of:

irradiating at least one of the plurality of cells with an information reproducing light beam;

changing the wavelength of the information reproducing light beam within a predetermined range including at least one wavelength at which multiple interference occurs between the first and second reflecting layers with respect to said at least one cell irradiated by the information reproducing light beam;

detecting said at least one wavelength of light which effects multiple interference; and reproducing the multiple-value information recorded in each of said at least one cells irradiated by the information reproducing light beam in accordance with said at least one wavelength detected in said detecting step.

2. A method according to claim 1, wherein the light beam and the recording medium are moved relative to each other in the direction of the array of the cells, and said steps are repeated when each cell is irradiated with the light beam.

3. A method of reproducing information stored in an optical information recording medium having a base, first and second reflecting layers formed on the base parallel to and at a predetermined distance form each other, and an information storage layer which is formed between the first and second reflecting layers and which includes an array of a plurality of cells, each cell having a refractive index of a different value corresponding to multiple-value information stored therein, said method comprising the steps of:

irradiating at least one of the plurality of cells with an information reproducing light beam;

changing the wavelength of the information reproducing light beam within a predetermined range and at a predetermined rate, the predetermined range including at least one wavelength at which multiple interference occurs between the first and second reflecting layers with respect to said at least one cell irradiated by the information reproducing light beam;

detecting the intensity of light reflected by or transmitted through the recording medium, the intensity of light detected having a peak value at a moment when the wavelength of the detected light is equal to a wavelength at which multiple interference occurs;

measuring a time period between a reference moment and the moment at which the peak value of the intensity is detected; and reproducing information recorded in each of said at least one cell irradiated by the information reproducing light beam in accordance with the time period detected in the detecting step.

4. A method according to claim 3, wherein said reference moment coincides with the moment at which the change in the wavelength of the light beam is started.

5. A method according to claim 3, wherein the light beam and the recording medium are moved relative to each other in the direction of the array of cells, and said steps are repeated when each cell is irradiated with the light beam.

6. A method of reproducing information stored in an optical information recording medium having a base, first and second reflecting layers formed on the base parallel to and at a predetermined distance from each other, and an information storage layer which is formed between the first and second reflecting layers and which includes an array of a plurality of cells, each cell having a refractive index of a different value corresponding to multiple-value information stored therein, said method comprising the steps of:

irradiating at least one of the plurality of cells with an information reproducing light beam;

changing the wavelength of the information reproducing light beam within a predetermined range and at a predetermined rate, the predetermined range including two wavelengths at which multiple interference occurs between the first and second reflecting layers with respect to each of said at least one cells irradiated by said information reproducing light beam;

detecting the intensity of light reflected by or transmitted through the recording medium, the intensity of light detected having a peak value at a moment when the wavelength of the detected light is equal to a wavelength at which multiple interference occurs, a peak value of the intensity being detected two times at respective moments corresponding to two wavelengths at which multiple interference occurs;

measuring a time period between the two moments at which respective peak values are detected; and reproducing the multiple-value information stored in each of said at least one cells irradiated by the information reproducing light beam in accordance with the time period detected in said detecting step.

7. A method according to claim 6, wherein the light beam and the recording medium are moved relative to each other in the direction of the array of cells, and said steps are repeated when each cell is irradiated with the light beam.

8. A method of reproducing information stored in an optical information recording medium having a base, first and second reflecting layers formed on the base parallel to and at a predetermined distance from each other, and an information storage layer which is formed between the first and second reflecting layers and which has a plurality of reference cells each having a refractive index corresponding to reference information, and a plurality of data cells, each cell having a refractive index of a different value corresponding to multiple-value data stored therein, the reference cells and the data cells being alternately arranged, said method comprising the steps of:

scanning the recording medium with an information reproducing light beam in a direction of the array of cells at a predetermined speed;

changing the wavelength of the information reproducing light beam within a first predetermined range at a first predetermined rate during a period of time when one of the reference cells is irradiated with the information reproducing light beam, the first predetermined range including a wavelength at which multiple interference occurs between the first and second reflecting layers with respect to one reference cell;

changing the wavelength of the information reproducing light beam within a second predetermined range and at a second predetermined rate during a period of time when one of the plurality of data cells is irradiated with the information reproducing light beam, the second predetermined range including a wavelength at which multiple interference occurs between the first and second reflecting layers with respect to each of said plurality of reference cells and said plurality of data cells;

detecting the intensity of light reflected by or transmitted through the recording medium, the intensity of light detected having a peak value at a moment when the wavelength of the detected light is equal to a wavelength at which multiple interference occurs, the peak value of the intensity being detected during each period of time when a reference cell is irradiated with the information reproducing light beam and during each period of time when data cell is irradiated with the information reproducing light beam;

measuring a time period between a moment at which a peak value is detected with respect to a reference cell and a moment at which a peak value is detected with respect to a data cell; and reproducing information stored in the data cell in accordance with the time period measured in said measuring step.

9. A method of initializing an optical information recording medium having a base, first and second reflecting layers formed on the base parallel to and at a predetermined distance form each other; and a recording layer which has a plurality of cells and which is formed between the first and second reflecting layers and which is changed in its refractive index when irradiated with a light beam, said method comprising the steps of:

irradiating one or more of cells of the recording layer with a reproducing light beam;

changing the wavelength of the reproducing light beam within a predetermined range and at a predetermined rate, the predetermined range including at least one wavelength at which multiple interference occurs between the first and second reflecting layers with respect to each cell;

detecting the intensity of light reflected by or transmitted through the medium, the intensity of light detected being peaked at the moment when the wavelength of the detected light becomes equal to the wavelength at which multiple interference occurs;

measuring the time between a reference moment and the moment at which the peak value of the intensity is detected;

comparing the time measured and a reference time; and irradiating one or more of the cells with a recording light beam having an intensity according to the result of the comparison to adjust the refractive index of the cell.

10. A method according to claim 9, wherein the reproducing light beam and the recording medium are moved relative to each other in the direction in which the cells are arranged, and said steps are repeated when each cell is irradiated with the reproducing light beam.

* * * * *

UNITED STATES PATENT AND TRADEMARK OFFICE
CERTIFICATE OF CORRECTION

PATENT NO. : 5,786,117

DATED : July 28, 1998

INVENTOR(S) : HIROAKI HOSHI, ET AL.

Page 1 of 3

It is certified that error appears in the above-identified patent and that said Letters Patent is hereby corrected as shown below:

<u>Column 1</u>
Line 7, "08/130,376" should read --08/130,676--.

<u>Column 5</u>
Line 1, "FIG. 2G" should read --FIG. 2B--.

<u>Column 6</u>
Line 58, "α," should read --d,--.

<u>Column 8</u>
Line 19, "$\lambda_m$-" should read --$\lambda_m$=--; and
Line 40, "$\Psi_{\text{iNT}}$" should read --$\Psi_{\text{INT}}$--.

<u>Column 9</u>
Line 7, "derive" should be deleted.

<u>Column 10</u>
Line 58, "FIG. 4D," should read --FIG 4B,--; and "an" should read --a--.

UNITED STATES PATENT AND TRADEMARK OFFICE
CERTIFICATE OF CORRECTION

PATENT NO. : 5,786,117

DATED : July 28, 1998

INVENTOR(S) : HIROAKI HOSHI, ET AL.

It is certified that error appears in the above-identified patent and that said Letters Patent is hereby corrected as shown below:

Column 13
Line 9, "and" should read --an--; and
Line 62, "wavelength" should read --wavelengths--.

Column 16
Line 53, "non uniformities" should read --non-uniformities--.

Column 18
Line 38, "multiple-vale" should read --multiple-value--.

Column 19
Line 50, "$^\wedge\theta(\lambda)$" should read --$\Delta\theta(\lambda)$--; and
Line 54, "$\Delta X\alpha f\Delta\lambda$" should read --$\Delta x\alpha f\Delta\lambda$--.

Column 20
Line 3, "(33." should read --(33).--.

Column 21
Line 38, "$^\wedge d$" should read --$\Delta d$--.

UNITED STATES PATENT AND TRADEMARK OFFICE
CERTIFICATE OF CORRECTION

PATENT NO. : 5,786,117

DATED : July 28, 1998

INVENTOR(S) : HIROAKI HOSHI, ET AL.

It is certified that error appears in the above-identified patent and that said Letters Patent is hereby corrected as shown below:

Column 22
Line 49, "$^\wedge\Psi$" should read --$\Delta\Psi$--.

Column 23
Line 2, "$^\wedge\Psi=0$" should read --$\Delta\Psi=0$--.

Column 24
Line 51, "form" should read --from--.

Column 26
Line 6, "to one" should read --to the one--; and
Line 36, "form" should read --from--.

Signed and Sealed this

Twenty-fifth Day of April, 2000

Attest:

Q. TODD DICKINSON

*Attesting Officer*            *Director of Patents and Trademarks*